US008385091B2

(12) United States Patent
Nielsen

(10) Patent No.: US 8,385,091 B2
(45) Date of Patent: Feb. 26, 2013

(54) 3-PHASE HIGH-POWER UPS

(75) Inventor: Henning Roar Nielsen, Brenderup (DK)

(73) Assignee: Electric IT Corporation, West Kingston, RI (US)

( * ) Notice: Subject to any disclaimer, the term of this patent is extended or adjusted under 35 U.S.C. 154(b) by 729 days.

(21) Appl. No.: 12/544,815

(22) Filed: Aug. 20, 2009

(65) Prior Publication Data

US 2011/0044077 A1  Feb. 24, 2011

(51) Int. Cl.
*H02M 5/45* (2006.01)
(52) U.S. Cl. .............................. 363/37; 363/65
(58) Field of Classification Search .............. 363/34, 363/36, 37, 65, 67, 69, 70, 71
See application file for complete search history.

(56) References Cited

U.S. PATENT DOCUMENTS

| | | | |
|---|---|---|---|
| 4,065,711 A | 12/1977 | Kawabata | |
| 4,114,048 A | 9/1978 | Hull et al. | |
| 4,564,747 A | 1/1986 | Offermann | |
| 4,665,322 A | 5/1987 | Eishima et al. | |
| 5,017,800 A | 5/1991 | Divan | |
| 5,477,091 A | 12/1995 | Fiorina et al. | |
| 5,644,483 A | 7/1997 | Peng et al. | |
| 5,684,686 A | 11/1997 | Reddy | |
| 6,031,738 A | 2/2000 | Lipo et al. | |
| 6,069,412 A | 5/2000 | Raddi et al. | |
| 6,184,593 B1 | 2/2001 | Jungreis | |
| 6,437,996 B1 * | 8/2002 | Wobben | 363/37 |
| 6,631,080 B2 * | 10/2003 | Trimble et al. | 363/34 |
| 6,661,678 B2 | 12/2003 | Raddi et al. | |
| 6,757,185 B2 | 6/2004 | Rojas Romero | |
| 6,903,537 B2 | 6/2005 | Tzeng et al. | |
| 7,106,607 B2 * | 9/2006 | Nielsen | 363/142 |

(Continued)

FOREIGN PATENT DOCUMENTS

| | | |
|---|---|---|
| CN | 1476139 A | 2/2004 |
| WO | 97/44877 | 11/1997 |

(Continued)

OTHER PUBLICATIONS

Introduction to Power Supplies, National Semiconductor, Application Note 556, 2002 National Semiconductor Corporation, www.national.com, pp. 1-7 (Sep. 2002).

(Continued)

*Primary Examiner* — Matthew Nguyen
(74) *Attorney, Agent, or Firm* — Lando & Anastasi, LLP

(57) ABSTRACT

According to one aspect, embodiments of the invention provide power converter circuitry including an input including a plurality of input lines each configured to be coupled to a phase of a multiphase AC power source having a sinusoidal waveform, a plurality of DC buses including a first positive DC bus having a first nominal DC voltage, a second positive DC bus having a second nominal DC voltage, a first negative DC bus having a third nominal DC voltage and a second negative DC bus having a fourth nominal DC voltage; a first power converter coupled to the input and configured to supply power from the multiphase AC power source to the plurality of DC buses during a first positive region of the sinusoidal waveform and a first negative region of the sinusoidal waveform; and a second power converter coupled to the input and configured to supply power from the multiphase AC power source to at least some of the plurality of DC buses during a second positive region of the sinusoidal waveform and a second negative region of the sinusoidal waveform.

9 Claims, 15 Drawing Sheets

U.S. PATENT DOCUMENTS

| | | |
|---|---|---|
| 7,352,083 B2 | 4/2008 | Nielsen et al. |
| 7,639,520 B1 * | 12/2009 | Zansky et al. .................. 363/65 |
| 7,688,048 B2 | 3/2010 | Nielsen |
| 8,008,809 B2 | 8/2011 | Nielsen |
| 2001/0033502 A1 | 10/2001 | Blair et al. |
| 2002/0126518 A1 | 9/2002 | Lazarovich |
| 2002/0133728 A1 | 9/2002 | Agarwal |
| 2003/0076696 A1 | 4/2003 | Tsai |
| 2004/0084967 A1 | 5/2004 | Nielsen |
| 2004/0155526 A1 | 8/2004 | Naden et al. |
| 2004/0160210 A1 | 8/2004 | Bohne et al. |
| 2005/0024016 A1 | 2/2005 | Breen et al. |
| 2005/0036248 A1 | 2/2005 | Klikic et al. |
| 2005/0162019 A1 | 7/2005 | Masciarelli et al. |
| 2005/0168073 A1 | 8/2005 | Hjort |
| 2005/0201127 A1 | 9/2005 | Tracy et al. |
| 2006/0043792 A1 | 3/2006 | Hjort et al. |
| 2006/0238941 A1 | 10/2006 | Ingemi et al. |
| 2007/0064363 A1 | 3/2007 | Nielsen et al. |
| 2007/0228837 A1 | 10/2007 | Nielsen et al. |
| 2008/0061628 A1 | 3/2008 | Nielsen et al. |
| 2008/0252145 A1 | 10/2008 | Urakabe et al. |
| 2008/0253156 A1 | 10/2008 | Urakabe et al. |
| 2009/0261793 A1 | 10/2009 | Urakabe et al. |
| 2011/0280055 A1 | 11/2011 | Nielsen |

FOREIGN PATENT DOCUMENTS

| | | |
|---|---|---|
| WO | 0165659 A2 | 9/2001 |
| WO | 2005101634 A1 | 10/2005 |
| WO | 2006026549 A2 | 3/2006 |

OTHER PUBLICATIONS

International Search Report for PCT/US2008/054365 mailed Oct. 31, 2008.

EP Communication dated Jan. 18, 2011 from EP Application No. 08 730 212.1-2207.

Grzesiak and Tomasik; "DC Link Balancing Method in Back-to-Back UPS System with Multi-Level Converters", IEEE ISIE 2006, Jul. 9-12, 2006, Montreal, Quebec, Canada.

International Search Report for PCT/US2010/045587 mailed Feb. 3, 2011.

US 6,181,581, 01/2001, Johnson, Jr. et al. (withdrawn)

* cited by examiner

State 1

State 2

State 3

State 1

State 2

State 3

3-PHASE HIGH-POWER UPS

BACKGROUND OF INVENTION

Uninterruptible power supplies (UPSs) including voltage converters are fundamental parts of many electrical systems such as power supply systems for computers and servers in data centers. UPSs can be used with many typical power systems including single and 3-phase connections, and can be used with low-power systems (e.g., a household computer) and high-power systems (e.g., large data centers or process facilities). High-power systems typically use a 3-phase power connection (e.g., X, Y, and Z phases). A 3-phase UPS voltage converter is typically used to provide 3-phase AC power to a 3-phase load, to convert a 3-phase AC voltage from one level to another, and to provide 3-phase power to a load in the event of a power failure. The input and output connections to a 3-phase UPS voltage converter are typically three- or four-terminal connections, one connection for each phase of the 3-phase power connection and an optional neutral connection. A battery is also typically coupled to the UPS voltage converter and is used to store energy for use in case of a power failure.

Typical high power (e.g., above 100 kW) UPSs are operated using nominal AC input voltages of 3×400 V (in Europe) or 3×480 V (in the U.S.). Transformerless UPSs may operate with an internal DC bus voltage of ±450 V. In such a configuration, components contained in the UPS are preferably rated for at least 1200 V operation due to large voltage overshoots associated with stray inductances of physically large insulated gate bipolar transistor (IGBT) modules. The use of 1200 V components, however, typically leads to increased conduction and switching losses, thus lowering the efficiency.

SUMMARY OF INVENTION

According to one aspect, embodiments of the invention provide power converter circuitry including an input including a plurality of input lines each configured to be coupled to a phase of a multiphase AC power source having a sinusoidal waveform, a plurality of DC buses including a first positive DC bus having a first nominal DC voltage, a second positive DC bus having a second nominal DC voltage, a first negative DC bus having a third nominal DC voltage and a second negative DC bus having a fourth nominal DC voltage; a first power converter coupled to the input and configured to supply power from the multiphase AC power source to the plurality of DC buses during a first positive region of the sinusoidal waveform and a first negative region of the sinusoidal waveform; and a second power converter coupled to the input and configured to supply power from the multiphase AC power source to at least some of the plurality of DC buses during a second positive region of the sinusoidal waveform and a second negative region of the sinusoidal waveform.

According to one embodiment, the first positive region includes phase angles of the sinusoidal waveform in a region about a phase angle of a peak positive amplitude of the sinusoidal waveform, the first negative region includes phase angles of the sinusoidal waveform in a region about a phase angle of a peak negative amplitude of the sinusoidal waveform, and the second positive region and the second negative region include phase angles of the sinusoidal waveform in a region about a zero crossing of the sinusoidal waveform.

According to another aspect, embodiments of the invention provide a method of providing AC output power from a UPS, the UPS including a multiphase AC input, a plurality of DC buses including a first positive DC bus, a second positive DC bus, a first negative DC bus and a second negative DC bus, power converter circuitry including a first power converter and a second power converter each coupled to the AC input and at least one of the plurality of DC buses. According to some embodiments, the method includes acts of: supplying power from the multiphase AC input to an input of the first power converter and providing power to the plurality of DC buses from an output of the first power converter during a first positive region of a sinusoidal waveform provided from the multiphase AC input and during a first negative region of the sinusoidal waveform; supplying power from the multiphase AC input to an input of the second power converter and providing power to at least some of the plurality of DC buses from an output of the second power converter during a second positive region of the sinusoidal waveform and during a second negative region of the sinusoidal waveform; and converting power supplied from the plurality of DC buses to AC output power provided at an AC output of the UPS.

According to a further aspect, embodiments of the invention provide a method of providing AC output power from a UPS, the UPS including an AC input, a first power converter coupled to the AC input, a second power converter coupled to the AC input, a DC power source and a DC bus. According to some embodiments, the method includes acts of: supplying power from the AC input to an input of the first power converter and providing power to the DC bus from an output of the first power converter in a first operating state of the UPS; supplying power from the AC input to an input of the second power converter and providing power to the DC bus from an output of the second power converter in each of the first operating state of the UPS and in a second operating state of the UPS; supplying power from the DC power source to the input of the first power converter and providing power to the DC bus from the output of the first power converter in the second operating state of the UPS; and converting power supplied from the DC bus to AC output power provided at an AC output of the UPS in each of the first operating state and the second operating state.

Various aspects of the invention may provide one or more of the following capabilities. Reliable 3-phase power can be provided to a load. Physical size of a 3-phase UPS can be reduced compared to prior techniques. Efficiency can be increased compared with prior techniques. A transformerless circuit can be used to convert AC power to DC, DC power to AC, and DC power from a first voltage to a second voltage. IGBT switching losses can be reduced compared to prior techniques. Components having a lower voltage rating can be used when compared with prior techniques. Heat losses can be reduced compared with prior techniques. The desire for flying capacitors and/or clamp diodes can be reduced, when compared with prior techniques. A voltage of a battery used with a UPS can be reduced compared to prior techniques. Unbalanced operation caused by a mismatch of the voltage provided to the input of a 3-phase UPS and the power drawn from the output of the 3-phase UPS can be compensated without using a transformer.

These and other capabilities of the invention, along with the invention itself, will be more fully understood after a review of the following figures, detailed description, and claims.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
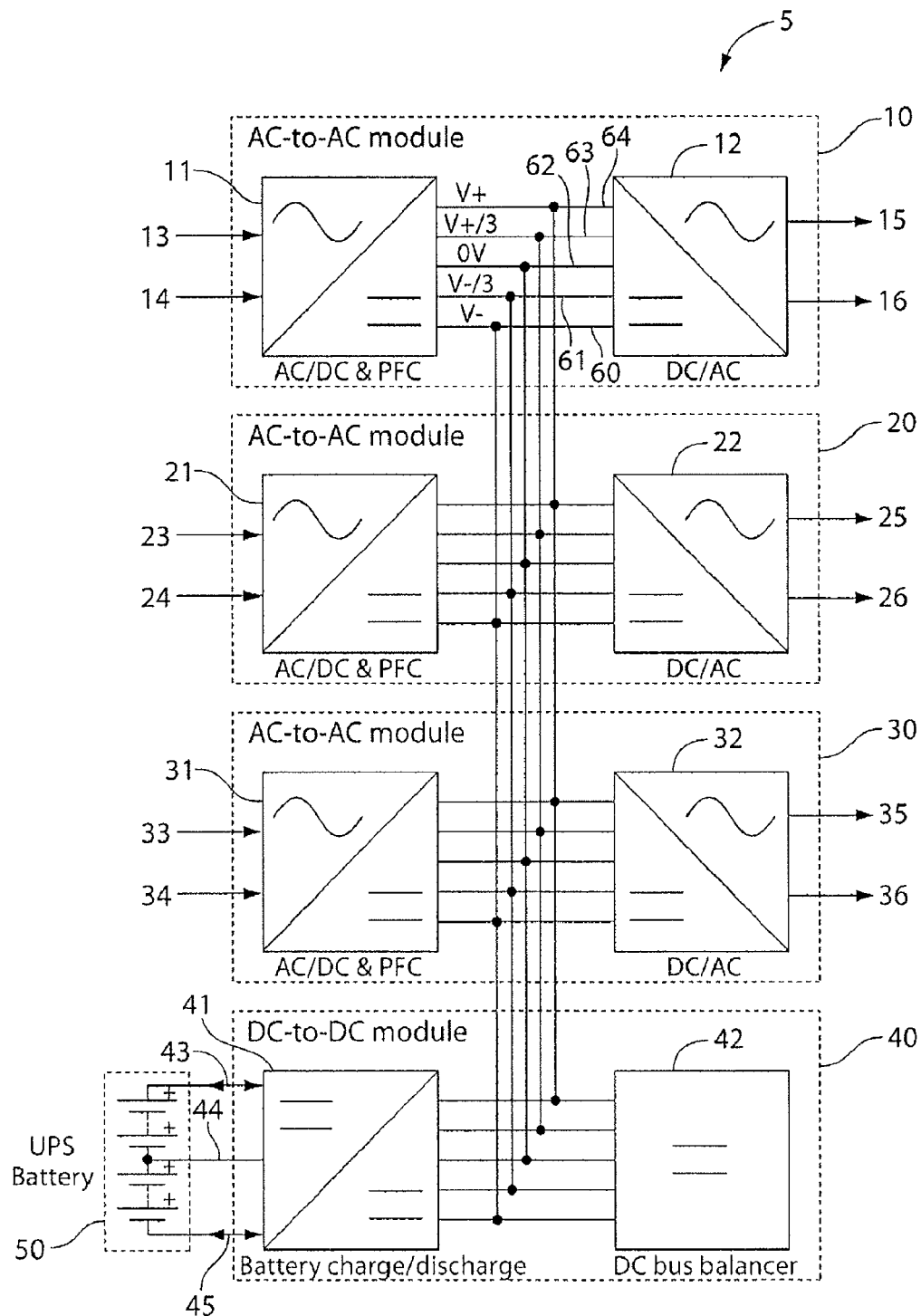
FIG. 1 is a schematic diagram of a 3-phase UPS.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of the invention provide techniques for providing an uninterruptible 3-phase power supply to a load. For example, a transformerless 3-phase uninterruptible power supply includes AC/DC converters (e.g., power factor correction modules), DC/AC converters (e.g., inverters), a DC/DC conversion module, multiple DC buses, and a DC bus balancer. The AC/DC converters receive 3-phase AC power (e.g., 3×400 V or 3×480 V phase-phase) from a 3-phase power source and convert the 3-phase power into DC power (e.g., with multiple voltage levels). Each of the AC/DC converters receives one phase of the 3-phase power connection. Under normal operation (e.g., when suitable 3-phase power is received from the 3-phase power source), the DC power present on the DC buses provides power to the DC/AC converters. Furthermore, during normal operation, a DC/DC converter converts the DC power present on the DC buses to a voltage used to charge the battery. During other times (e.g., when the 3-phase power is insufficient or unavailable), DC power is provided to the DC/AC converters from the battery. The DC/AC converters convert the DC power into 3-phase AC power (e.g., each of the DC/AC converters provide a single phase of the 3-phase signal). The voltages received by the AC/DC converters and the voltages provided by the DC/AC converters can be equal or different. During normal operation or otherwise, the DC bus balancer balances the voltages present on the DC buses by shifting energy between the DC buses. Other embodiments are within the scope of the invention.

Referring to FIG. 1, a UPS 5 includes AC/AC modules 10, 20, and 30, a DC/DC module 40, a battery 50, and buses 60, 61, 62, 63 and 64. The AC/AC module 10 includes an AC/DC converter 11 coupled to a DC/AC converter 12 via the buses 60, 61, 62, 63 and 64. The AC/AC module 20 includes an AC/DC converter 21 coupled to a DC/AC converter 22 via the buses 60, 61, 62, 63, and 64. The AC/AC module 30 includes and AC/DC converter 31 coupled to a DC/AC converter 32 via the buses 60, 61, 62, 63, and 64. The DC/DC module 40 includes a DC/DC converter 41 and a DC bus balancer 42. The DC/DC converter 41 is coupled to the DC bus balancer 42 via the buses 60, 61, 62, 63 and 64. The AC/AC modules 10, 20 and 30, and the DC/DC module 40 are interconnected via the buses 60, 61, 62, 63, and 64. The UPS 5 is configured to provide power to a load (not shown) from either a 3-phase power feed coupled to the UPS 5 and/or from energy stored in the battery 50.

Each of the AC/AC modules 10, 20, and 30 are configured to receive one phase (e.g., the X, Y, or Z-phase) of a 3-phase power feed at a first AC voltage, and to provide a second AC voltage via an output. The AC/DC converter 11 includes inputs 13 and 14; the AC/DC converter 21 includes inputs 23 and 24; and the AC/DC converter 31 includes inputs 33 and 34. The DC/AC converter 12 includes outputs 15 and 16; the DC/AC converter 22 includes outputs 25 and 26; and the DC/AC converter 32 includes outputs 35 and 36. Each of the AC/AC modules 10, 20, and 30 are configured to be coupled to one phase of a 3-phase power feed and to a neutral connection. For example, the input 13 of the AC/DC converter 11 can be coupled to the X phase, the input 23 of the AC/DC converter 21 can be coupled to the Y phase, and the input 33 of the AC/DC converter 31 can be coupled to the Z phase. The inputs 14, 24, and 34 are configured to be coupled to the neutral connection of the 3-phase power feed (or a ground connection). Each of the AC/AC modules 10, 20, and 30 are configured to provide an output including one phase of a 3-phase output, although other configurations are possible. For example, the output 15 can be configured to provide the X phase output, output 25 can be configured to provide the Y phase output, and 35 can be configured to provide the Z phase output. Each of the outputs 16, 26, and 36 are configured to be coupled to a neutral connection of a load. Each of the AC/AC modules 10, 20, and 30 are configured to share power via the buses 60, 61, 62, 63, and 64.

The DC/DC module 40 can receive power from (i.e., when in a charging state) and provide power to (i.e., when in a discharging state) the AC/AC modules 10, 20, and/or 30. The DC/DC converter 41 is configured to be coupled to the battery 50 via connections 43, 44, and 45. The connection 44, however, is optional. The battery 50 is preferably a lead acid battery, although other types of batteries can be used. The DC/DC module 40 is configured to provide DC power to the battery 50 (thereby charging the battery 50) when a desired 3-phase power feed is present at the inputs 13, 23 and 33 (i.e., the charging state). Likewise, the DC/DC module 40 is configured to provide one or more DC voltages, using energy from the battery 50, to the AC/AC modules 10, 20, and 30 in the absence of a desired 3-phase power feed at the inputs 13, 23, and 33 (i.e., the discharging state). The state that the DC/DC module 40 is operating is can be controlled by a controller (not shown) that is configured to monitor, for example, the 3-phase AC input. The DC/DC converter 41 is configured to, in the charging state, receive a DC voltage set from the AC/AC modules 10, 20, and 30 and to convert the DC voltage set to a DC battery-charge voltage desired by the battery 50. The DC/DC converter 41 is further configured to, during the discharging state, receive DC power from the battery 50 at the battery-charge voltage, and to convert it to the DC voltage set. The DC/DC converter 41 is configured to provide the DC voltage set to the AC/AC modules 10, 20 and 30 during the discharging state. The DC/DC converter 41 is coupled to the DC bus balancer 42 via the buses 60, 61, 62, 63 and 64. The DC bus balancer 42 is configured to balance voltages present on the buses 60, 61, 62, 63, and 64, as will be described in more detail below.

The UPS 5 is configured to determine whether or not suitable input power is present on the inputs to the AC/AC modules 10, 20, and/or 30. The UPS 5 can detect the presence of suitable power on the inputs to the AC/AC modules using one or more methods and/or circuitry. For example, the UPS 5 can include circuitry configured to determine whether an AC voltage present on the inputs 13, 23, and/or 33, if any, is at a desired level. The UPS 5 can also include circuitry configured to monitor what state the DC/DC converter 41 is operating in (e.g., the charging or discharging state) and whether a DC voltage is present on the buses 60, 61, 63, and/or 64. For example, if the DC/DC converter 41 is operating in the charging state, and the respective DC voltage on the buses 60, 61, 63 and/or 64 drops below a respective desired level, the circuitry can provide a signal indicating that the AC voltage being provided to the AC/AC converters 11, 21, and 31 has dropped below desired levels. Other methods and/or circuitry can be used to detect if the input AC voltage is below desired levels. The UPS 5 is further configured to disconnect itself from the 3-phase power feed (e.g., by setting switches (as described below) to off positions).

Pulse width modulation (PWM) controllers are configured to control the operation of at least some of the components in the UPS 5. For example, separate PWM controllers can be used for the AC/DC converters 11, 21, and 31, the DC/AC converters 12, 22, and 32, the DC/DC module 41, and the DC bus balancer 42, although other configurations are possible. For example, separate PWM controllers having the same physical configuration, but using different control signals, can be used, or alternatively, PWM controllers having non-identical physical configurations can be used. The PWM controller can be configured to control the switching of a portion of the switches as a function of the frequency and phase of the AC input signal (e.g., using a feedback loop), or can be set in accordance with a desired output (e.g., to provide power of a desired frequency and phase to a load coupled to the DC/AC converters 12, 22, and 32.

Figure 2:
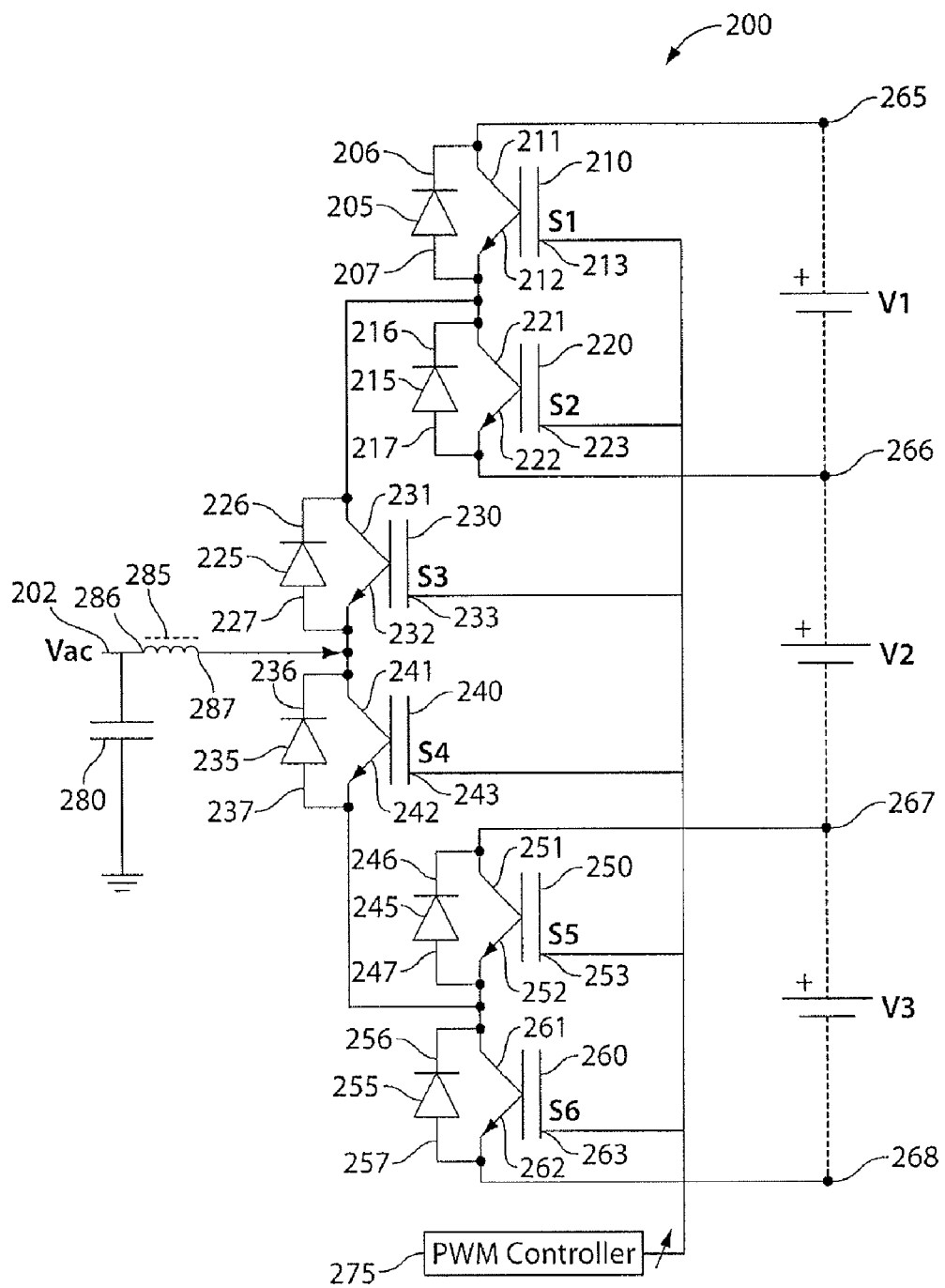
FIG. 2 is a circuit diagram of an AC/DC converter.

Referring to FIG. 2, an AC/DC converter 200 (e.g., an exemplary embodiment of the AC/DC converters 11, 21, and 31) includes diodes 205, 215, 225, 235, 245, and 255, switches 210, 220, 230, 240, 250, and 260, a capacitor 280, and an inductor 285. The switches 210, 220, 230, 240, 250, and 260 are insulated gate bipolar transistors (IGBTs) although other switches can be used. Preferably, the switches 210, 220, 250, and 260 have a maximum voltage rating of 600V and the switches 230 and 240 have a maximum voltage rating of 1200V, although other voltage ratings are possible. An input 202 is configured to be coupled to, for example, one phase of the 3-phase power feed (e.g., the X phase). Coupled between the input 202 and a ground connection is the capacitor 280. A node 286 of the inductor 285 is also coupled to the input 202. Coupled to a node 287 of the inductor 285 is an anode 227 of the diode 225, an emitter 232 of the switch 230, a cathode 236 of the diode 235, and a collector 241 of the switch 240. A cathode 226 of the diode 225 is coupled to a collector 231 of the switch 230. An anode 237 of the diode 235 is coupled to an emitter 242 of the switch 240. The cathode 226, the collector 231, an anode 207 of the diode 205, an emitter 212 of the switch 210, a cathode 216 of the diode 215, and a collector 221 of the switch 220 are coupled together. The anode 237, the emitter 242, an anode 247 of the diode 245, an emitter 252 of the switch 250, a cathode 256 of the diode 255, and a collector 261 of the switch 260 are coupled together. A cathode 206 of the diode 205 and a collector 211 of the switch 210 are coupled to an output 265. An anode 217 of the diode 215 and an emitter 222 of the switch 220 are coupled to an output 266. A cathode of 246 of the diode 245 and a collector 251 of the switch 250 are coupled to an output 267. An anode 257 of the diode 255 and an emitter 262 of the switch 260 are coupled to an output 268. Gates 213, 223, 233, 243, 253, and 263 of the switches 210, 220, 230, 240, 250, and 260, respectively, are each coupled to a pulse width modulation controller 275 as will be described in more detail below. The outputs 265, 266, 267, and 268 are configured to be coupled to the buses, 64, 63, 61, and 60, respectively. The inductor 285 preferably has an inductance of 100 uH, although other inductances can be used (e.g., depending on the power rating of the system 5). The capacitor preferably has a capacitance of 200 uF, although other capacitances can be used (e.g., depending on the power rating of the system 5).

The AC/DC converter 200 is configured to receive AC power from, for example, one phase of a 3-phase power connection and to provide a multi-level DC output via the outputs 265, 266, 267, and 268. For example, when the AC/DC converter 200 is in operation and the input 202 is coupled to a 480 VAC power feed, the AC/DC converter 200 can to induce a voltage (relative to a neutral connection of the power feed) of about +450 VDC across the output 265 and the neutral connection, a voltage of about +150 VDC across the output 266 and the neutral, a voltage of about −150 VDC across the output 267 and the neutral, and a voltage of about −450 VDC across the output 268 and the neutral. Likewise, the AC/DC converter 200 is configured to induce a voltage of about 300 VDC across the outputs 265 and 266 (V1), the outputs 266 and 267 (V2), and the outputs 267 and 268 (V3).

Preferably the voltage induced on the outputs 265 and 268 is a function of the input voltage. The voltage induced on the outputs 265 and 268 is preferably equal to or greater than the voltage across the capacitor 280 multiplied by $\sqrt{2}$ root). The voltage across the capacitor 280 (i.e., the phase-neutral voltage) is preferably substantially equal to:

$$\frac{\text{(Voltage at input 202)}}{\sqrt{3}} = (\text{Phase} - NeutralVoltage) \quad (1)$$

(if a neutral connection is available) and the instantaneous peak voltage across the capacitor 280 varies between ±(Phase-Neutral Voltage)($\sqrt{2}$)). Preferably, the AC/DC converter 200 is configured such that the voltage provided on the output 265 is greater than the positive peak instantaneous voltage across the capacitor 280 and the voltage provided on the output 268 is lower than the negative peak instantaneous voltage across the capacitor 280. For example, assuming an input of 480 V at the input 202, the phase-neutral is approximately 277 Vrms, and the instantaneous peak voltage across the capacitor 280 is about 392 V. Thus, in this example, the AC/DC converter 200 is configured such that the output 265 outputs a voltage of about 392 V or greater (e.g., 450 V) and the output 268 outputs a voltage of about −392 or less (e.g., −450 V). Increasing the difference between the absolute value of the voltages output on the outputs 265 and 268 and the absolute value of the peak instantaneous voltages across the capacitor 280 can increase the operating tolerance of the system 5.

The combination of the capacitor 280, the inductor 285, and the switches 210, 220, 230, 240, 250, and 260 is configured to act as a boost converter and to convert the AC signal provided to the input 202 into a four-level quasi-square wave (e.g., as shown as a signal 305 in FIG. 8) at the node 287 of the inductor 285. The voltage at the node 287 can vary depending on the state of the switches 210, 220, 230, 250, 260 (as described more fully below). For example, when the instantaneous value of the AC voltage present on the input 202 is between a first voltage level equal to the DC voltage at node 265 (e.g., 450 V, as determined by the configuration of the AC/DC converter 200) and a second voltage level equal to the DC voltage at the node 266 (e.g., 150 V), the square wave at the node of 287 of the inductor 285 switches between these values (here 450 V and 150 V); when the instantaneous value of the AC voltage present on the input 202 is between the second voltage level equal to the DC voltage at the node 266 and a third voltage level equal to the DC voltage at the node 267 (e.g., −150 V), the square wave at the node 287 of the inductor 285 switches between these values (e.g., −150 V and −150 V); and when the instantaneous value of the AC voltage present on the input 202 is between the third voltage level equal to the DC voltage at the node 267 and a fourth voltage level equal to the DC voltage at the node 268 (e.g., −450 V), the square wave at the node 287 of the inductor 285 switches between these values (e.g., −150 V and −450 V). Furthermore, the combination of the capacitor 280 and the inductor 285 is configured to act as a low pass filter.

Figure 3:
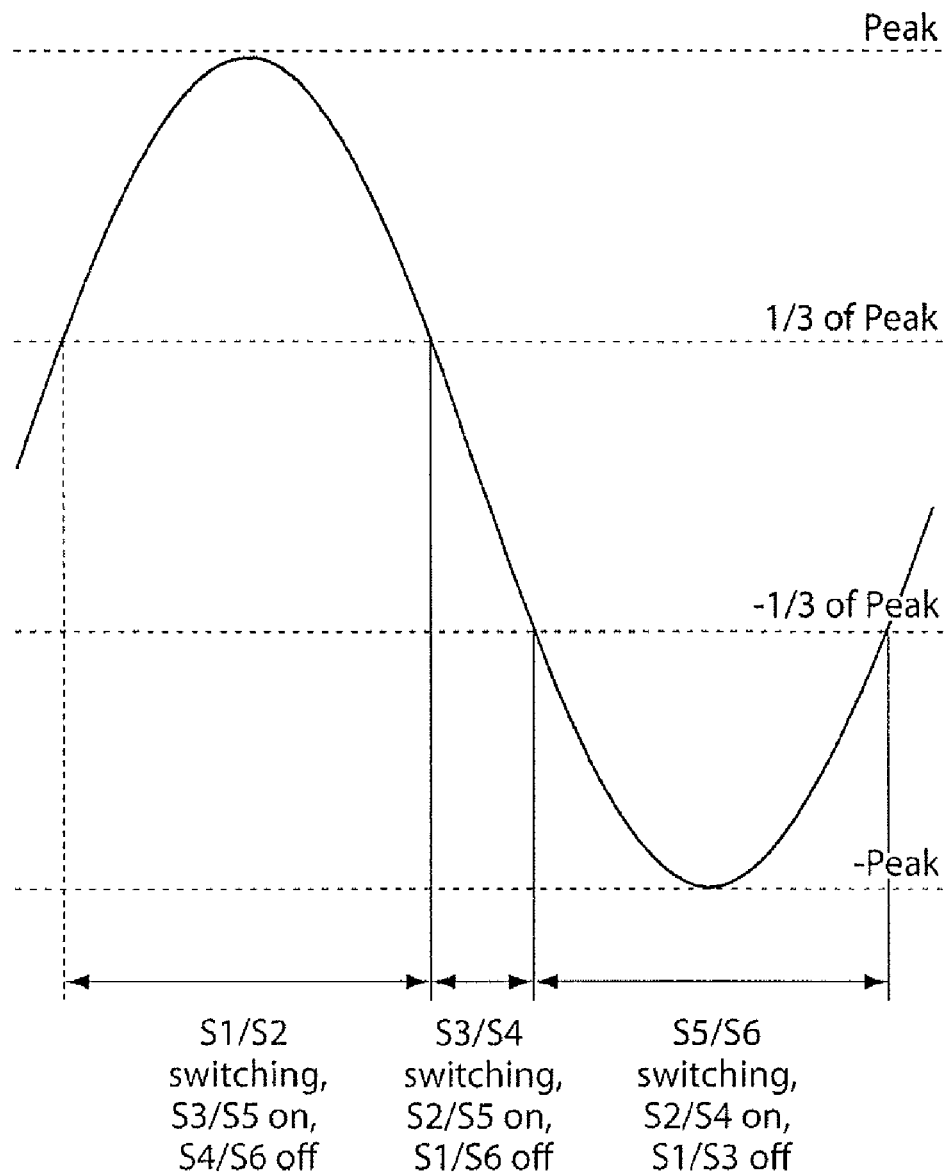
FIG. 3 is a graph representing an exemplary power signal provided to the AC/DC converter of FIG. 2.
Figure 4A:
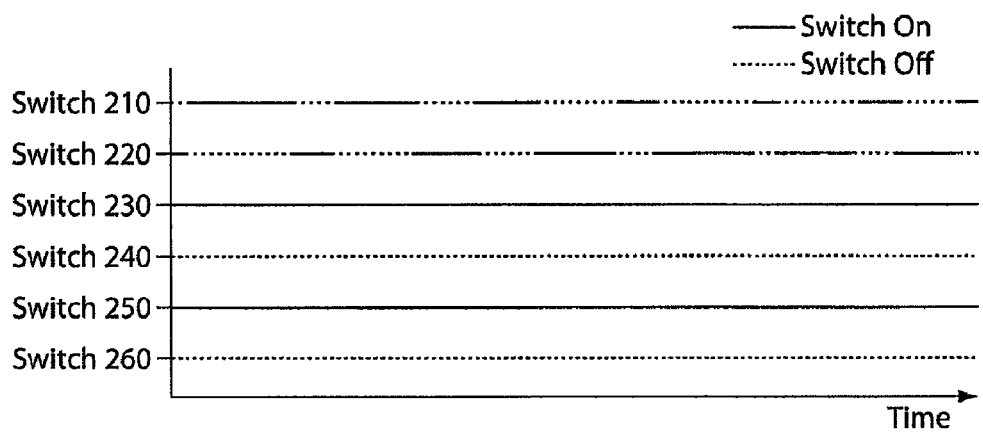
FIGS. 4A-4C are graphs representing states of switching in the AC/DC converter of FIG. 2.
Figure 4B:
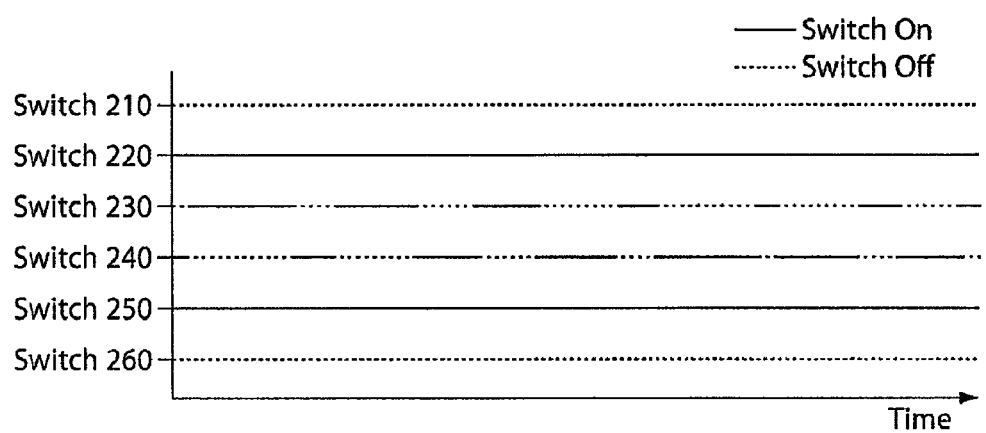
Figure 4C:
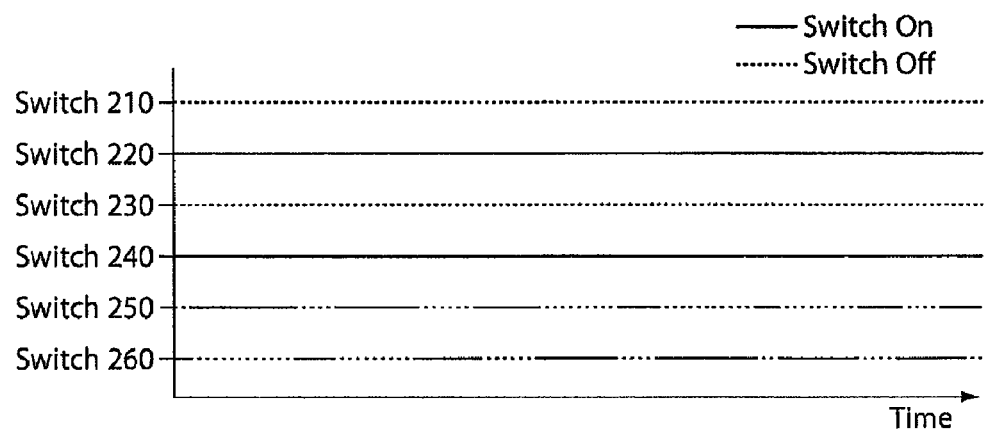

The AC/DC converter 200 is configured to induce voltages at the outputs 265, 266, 267, and 268 by switching the switches 210, 220, 230, 240, 250, and 260. The switches are configured to be actuated by the PWM controller 275. The PWM controller 275 is configured to control the switches 210, 220, 230, 240, 250, and 260 according to which one of three states the AC/DC converter 200 is operating in. Referring also to FIG. 3, the AC/DC converter 200 is configured to operate in three states. The first state corresponds to when the input voltage received by the input 202 is above one-third of the voltage provided by the output 265 (e.g., if the peak input voltage is ±450 VAC, then the first state corresponds to when the input is above 150 V). The second state corresponds to when the input received by the input 202 is between one-third of the voltage provided by the output 265, and one-third of the voltage provided by the output 268 (e.g., 150 V and −150 V). The third state corresponds to when the input received by the input 202 is below one-third of the voltage provided by the output 268 (e.g., below −150 V). Referring also to FIG. 4, the PWM controller 275 is configured such that during the first state the switches 230 and 250 are set to their on (conducting) states the switches 240 and 260 are set to their off (non-conducting) states, and the switches 210 and 220 are switching between off and on states (FIG. 4A). The PWM controller 275 is configured such that during the second state, the switches 220 and 250 are on, the switches 210 and 260 are off, and the switches 230 and 240 are switching (FIG. 4B). The PWM controller 275 is configured such that during the third state, the switches 220 and 240 are on, the switches 210 and 230 are off, and the switches 250 and 260 are switching (FIG. 4C).

Figure 5:
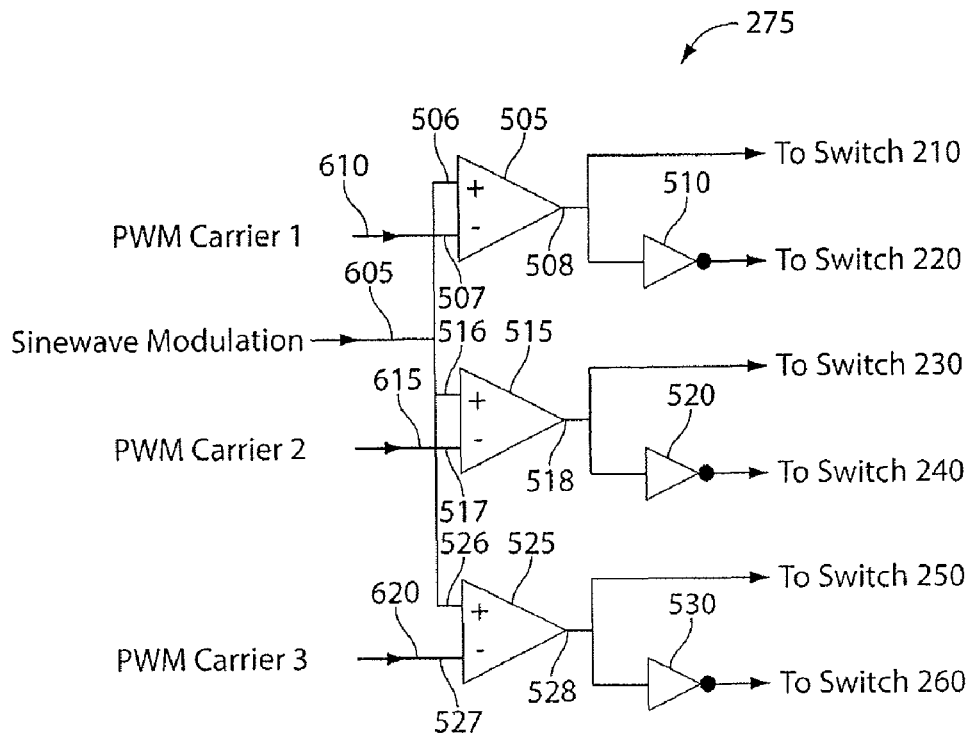
FIG. 5 is a circuit diagram of a pulse width modulation control circuit.
Figure 6:
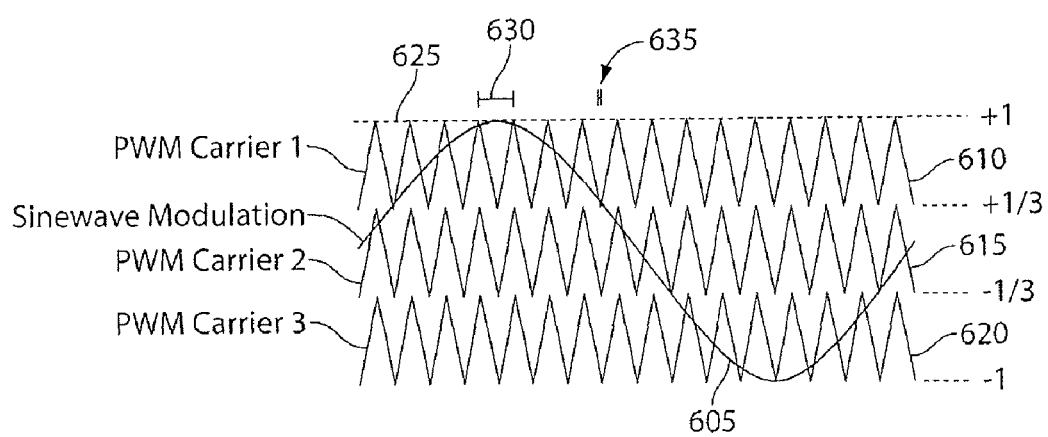
FIG. 6 is a diagram of exemplary control signals for use with the pulse width modulation control circuit of FIG. 5.

Referring to FIGS. 5-6, the PWM controller 275 is configured to control the switches 210, 220, 230, 240, 250, and 260 using control signals. The PWM controller 275 includes comparators 505, 515, and 525, and logic inverters 510, 520, and 530. The PWM controller 275 is configured to cause the AC/DC converter 200 to operate in the states described herein in order to convert an incoming AC signal to the DC signals described herein. A positive input 506 of the comparator 505 is coupled to a sinewave modulation signal source (to receive a signal 605), and a negative input 507 of the comparator 505 is coupled to a first PWM carrier signal 610. A positive input 516 of the comparator 515 is coupled to the sinewave modulation signal, and a negative input 517 of the comparator 515 is coupled to a second PWM carrier signal 615. A positive input 526 of the comparator 525 is coupled to the sinewave modulation signal, and a negative input 527 of the comparator 525 is coupled to a third PWM signal 620. An output 508 of the comparator 505 is coupled to the switch 210, and to the switch 220 via the logic inverter 510. An output 518 of the comparator 515 is coupled to the switch 230 and to the switch 240 via the logic inverter 520. An output 528 of the comparator 525 is coupled to the switch 250 and to the switch 260 via the logic inverter 530.

The control signals used by the PWM controller 275 are selected to achieve the desired switching pattern of the switches 210, 220, 230, 240, 250, and 260. The signals 605, 610, 615, and 620 are preferably low voltage signals generated by, for example, a waveform generator. The sinewave signal 605 is a sinusoidal signal having a frequency and phase about equal to the frequency and phase of the power feed provided to the input 202. The sinewave signal 605 has a peak amplitude about equal to a threshold 625, which can be various values, e.g., 1V. The first PWM carriers 610, 615, and 620 are triangular waves having a frequency substantially equal to the desired PWM switching frequency of the AC/DC converter 200, although other frequencies are possible. The PWM switching frequency of the AC/DC converter 200 is preferably chosen as a compromise between IGBT switching losses and the physical size and cost of input and output inductors and capacitors (e.g., the capacitor 280 and the inductor 285). A maximum value of the PWM control signal 610 is about equal to the threshold 625 and a minimum value of the first PWM control signal 610 is about equal to one-third of the threshold 625. A maximum value of the PWM control signal 615 is about equal to one-third of the threshold 625 and a minimum value of the PWM control signal 615 is about equal to negative one-third of the threshold 625. A maximum value of the PWM control signal 620 is about equal to negative one-third of the threshold 625 and a minimum value of the PWM control signal 620 is about equal to the threshold 625 multiplied by −1.

The PWM controller 275 is configured to switch the switches 210, 220, 230, 240, 250, and 260 using the sinewave modulation signal 605 and the PWM control signals 610, 615, and 620. As the sinewave modulation signal 605 varies, the comparator 505 will output either a logic one or a logic zero, corresponding to which of the positive input 505 or the negative input 507 is greater. The comparator 505 is configured to output a logic one if the positive input 506 is greater than the negative input 507, (e.g., the voltage of the sinewave modulation signal 605 is greater than the voltage of the PWM control signal 610). Likewise, the comparator 505 is configured to output a logic zero if the positive input 506 is less than the negative input 507, (e.g., the voltage of the sinewave modulation signal 605 is less than the voltage of the PWM control signal 610). While the above discussion has focused on the operation of the comparator 505, the operation of the comparators 515 and 525 is preferably similar. Preferably, the PWM controller 275 is configured to insert small "dead bands" such that there is a slight delay between the switching off any given switch and switching on another switch (e.g., to guard against undesired pairs of the switches being on simultaneously). The switches 210, 220, 230, 240, 250, and 260 are configured such that a logic 1 turns the switch on, while a logic 0 turns the switch off, although the reverse is possible.

The PWM controller 275 can be configured to vary the duty cycle at which the switches it controls are switched at. For example, using the signals 610, 615, 620 and 625, the duty cycle of the switches that are being repeatedly toggled (e.g., in the first state, the switches 210 and 220) is varied. Comparing intervals 630 and 635, which indicate when the switch 210 is turned on and the switch 220 is turned off, the interval 630 is larger than the interval 635.

Referring again to FIG. 2, examples of the operation of the AC/DC converter 200 will be described. The AC/DC converter 200 is configured to provide the respective DC voltages to the outputs 265, 266, 267, and 268 by acting as a boost converter. For example, in the first state when the switch 220 is on and the switch 210 is off, the inductor 285 will store energy. When the switch 220 is off, the energy stored in the inductor 285 causes a current to freewheel through the diode 205. In the second state when the switch 230 is on and the switch 240 is off, the inductor 285 will store energy. When the switch 230 is off, the inductor 285 causes a current to freewheel through the diode 235. In the third state, when the switch 250 is on, and the switch 260 is off, the inductor 285 will store energy. When the switch 250 is off, the energy stored in the inductor 285 causes a current to freewheel through the diode 255.

Figure 7:
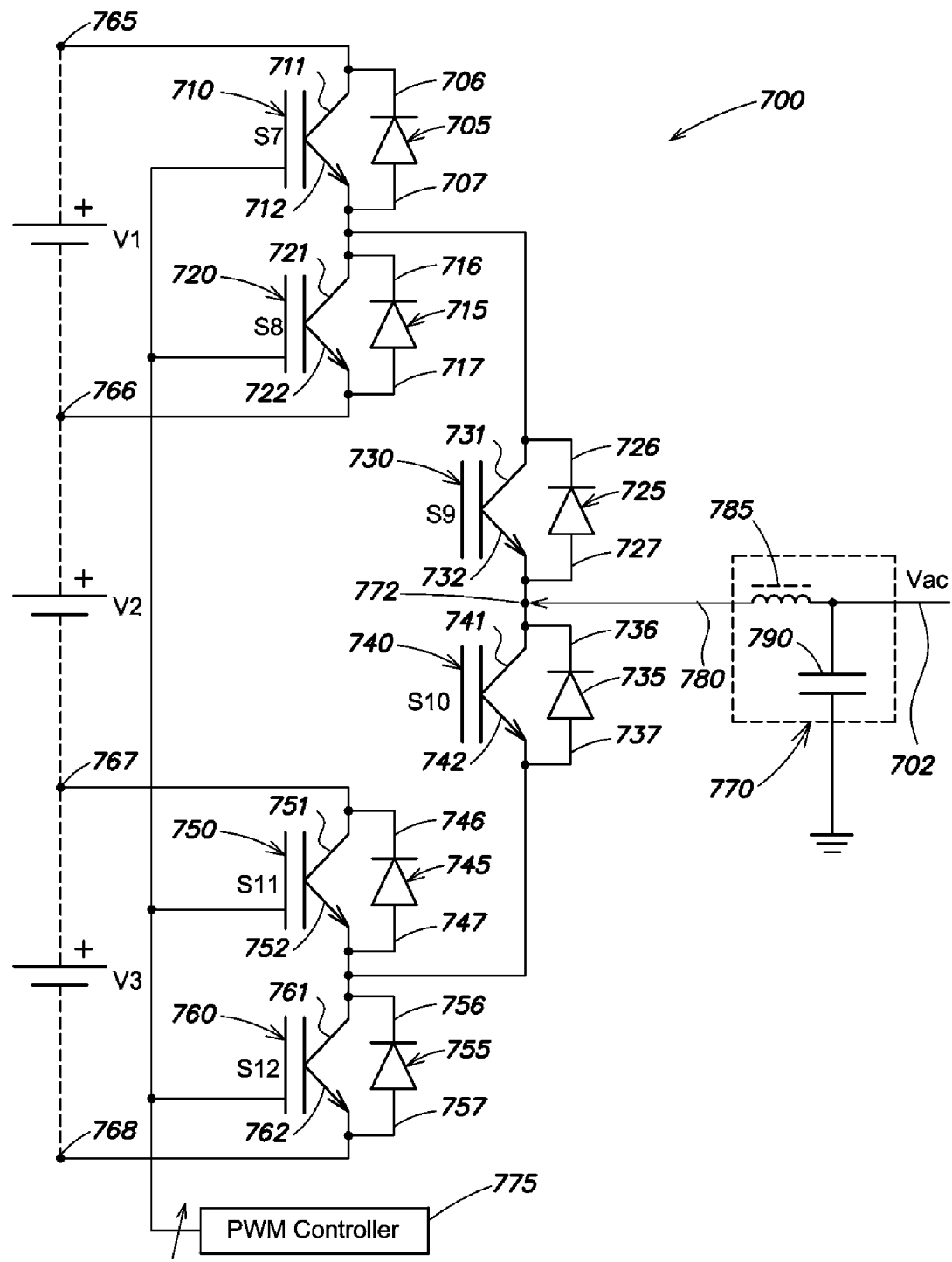
FIG. 7 is a circuit diagram of a DC/AC converter.

Referring to FIGS. 2 & 7, a DC/AC converter 700 (e.g, an exemplary embodiment of the DC/AC converters is 12, 22, and 32) includes diodes 705, 715, 725, 735, 745, and 755, switches 710, 720, 730, 740, 750, and 760, inputs 765, 766, 767, and 768, a filter 770, and an output 702. The switches 710, 720, 730, 740, 750, and 760 are IGBTs although other transistors can be used. Inputs 765, 766, 767, and 768 are configured to receive DC power from, for example, the AC/DC converter 200. Coupled to the output 702 is an anode 727 of the diode 725, emitter 732 of the switch 730, a cathode 736 of the diode 735, and a collector 741 of the switch 743. A cathode 726 of the diode 725 is coupled to a collector 731 of the switch 730. An anode 737 of the diode 735 is coupled to an emitter 742 of the switch 740. The cathode 726, the collector 731, an anode 707 of the diode 705, an emitter 712 of the switch 710, a cathode 716 of the diode 715, and a collector 721 of the switch 720 are coupled together. The anode 737, the emitter 742, an anode 747 of the diode 745, an emitter 752 of the switch 750, a cathode 756 of the diode 755, and a collector 761 of the switch 760 are coupled together. A cathode 706 of the diode 705 and a collector 711 of the switch 710 are coupled to the input 765. An anode 717 of the diode 715 and an emitter 722 of the switch 720 are coupled to the input 766. A cathode 746 of the diode 745 and a collector 751 of the switch 750 are coupled to the input 767. An anode 757 of the diode 755 and an emitter 762 of the switch 760 are coupled to the input 768. Bases 713, 723, 733, 743, 753, and 763 of the switches 710, 720, 730, 740, 750, and 760, respectively, are each coupled to a pulse width modulation controller as will be described in more detail below. The emitter 732 of the switch 730, the anode 727 of the diode 725, the collector 741 of the switch 740, and the cathode 736 of the diode 735 (i.e., defining node 772) are coupled to the filter 770. The filter 770 includes inductor 785 and capacitor 790. The inductor 785 is coupled between the node 772 and the output 702. The capacitor 790 is coupled between the output 702 and the ground. The inductor 785 preferably has an inductance of 100 uH, although other inductances can be used (e.g., depending on the power rating of the system 5). The capacitor 790 preferably has a capacitance of 200 uF, although other capacitances can be used (e.g., depending on the power rating of the system 5).

The DC/AC converter 700 is configured to receive DC power from, for example, the AC/DC converter 200, and to provide an AC output via the output 702. For example, when the DC/AC converter 700 is in operation, and the inputs 765, 766, 767, and 768 are coupled to the outputs 265, 266, 267, and 268, respectively, of the AC/DC converter 200, an AC output can be induced on the output 702. The DC/AC converter 700 is configured to induce on the output 702 an AC output having peak voltages (e.g., relative to the neutral connection) about equal to the voltages present on the input 765 (e.g., a positive peak voltage of the signal at the output 702) and the input 768 (e.g., a negative peak voltage of the signal at the output 702). Other voltages, however, can be induced.

The DC/AC converter 700 can be realized as a voltage or current controlled DC/AC converter. Preferably, an "outer" voltage loop is used to maintain a desired voltage when operating the DC/AC converter 700 using current control. For example, a control circuit (not shown) can be configured to monitor the current flow in the inductor 785 and to monitor the voltage present at the output 702 (e.g., to determine if the output is sinusoidal). The control circuit can be configured to adjust a PWM signal provided to the switches 710, 720, 730, 740, 750, and 760, based on the measured current and voltage values to maintain the desired output voltage. The DC/AC converter 700 can be configured to be operated with a fixed or variable PWM frequency, as described herein.

The DC/AC converter 700 is configured to convert the DC voltages present at the inputs 765, 766, 767, and 768 into an AC output voltage by switching the switches 710, 720, 730, 740, 750, and 760. The switches are configured to be actuated by a PWM controller 775 that is preferably configured in a manner similar to the PWM controller 275. The control signals provided to the PWM controller 775 can be similar to those provided to the PWM controller 275, although frequencies and/or amplitudes of the control signals can vary to produce a desired output for a load coupled to the output 702. Preferably, the DC/AC converter 700 is configured such that that in any given part of a line cycle (e.g., a cycle through the first, second, and third states) two of the six switches 710, 720, 730, 740, 750, and 760 are toggled in a complementary manner, while the remaining four switches are either constantly switched off or constantly switched on.

Figure 8:
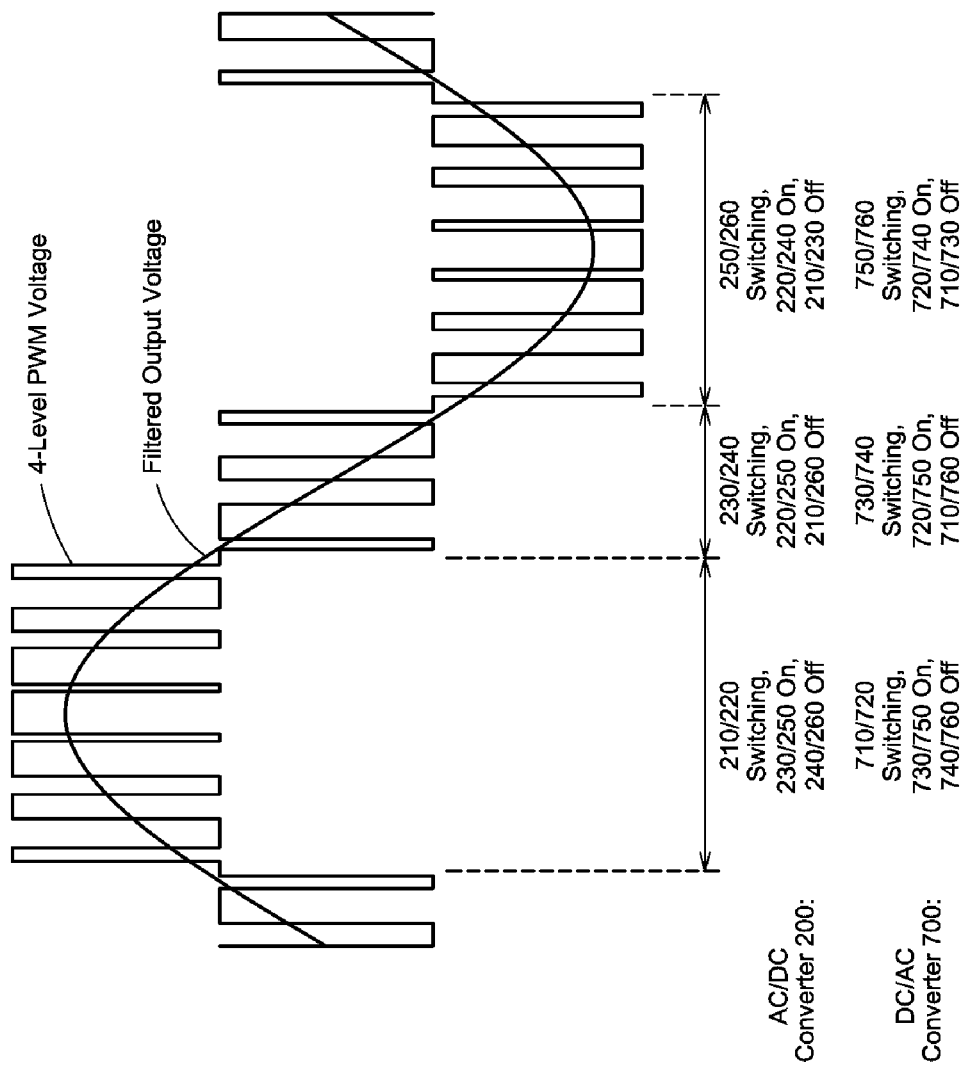
FIG. 8 is a graph representing exemplary AC and DC power signals.
Figure 9A:
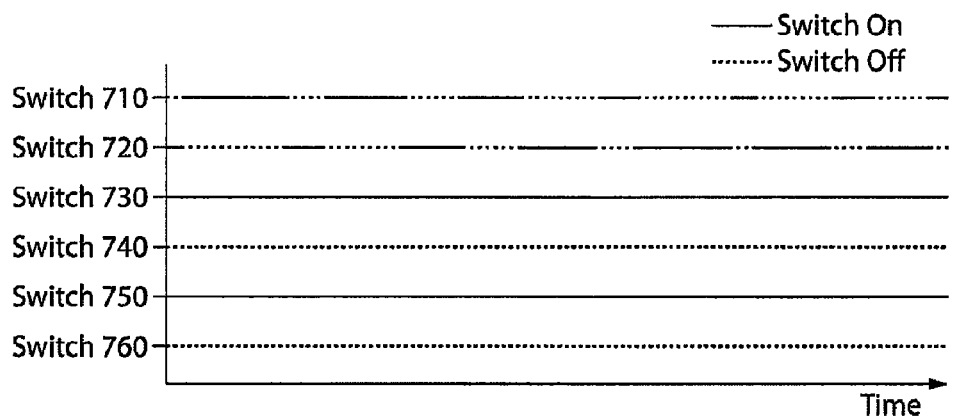
FIG. 9A-9C are graphs representing states of switches in the DC/AC converter of FIG. 8.
Figure 9B:
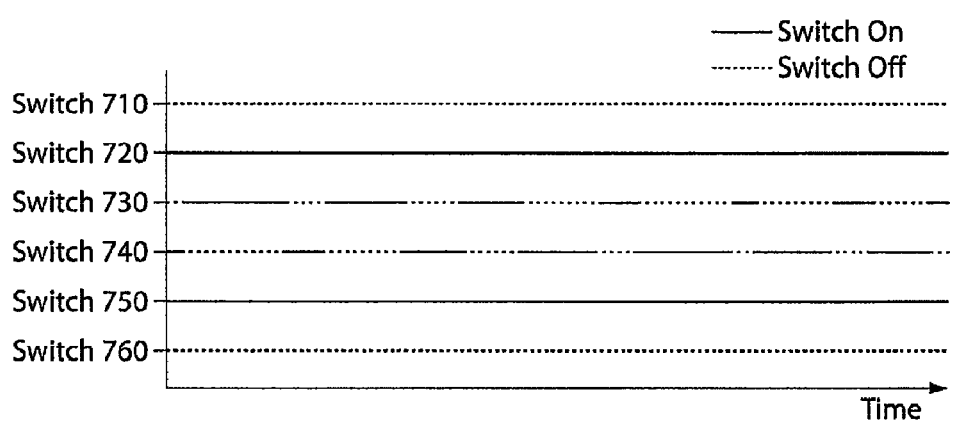
Figure 9C:
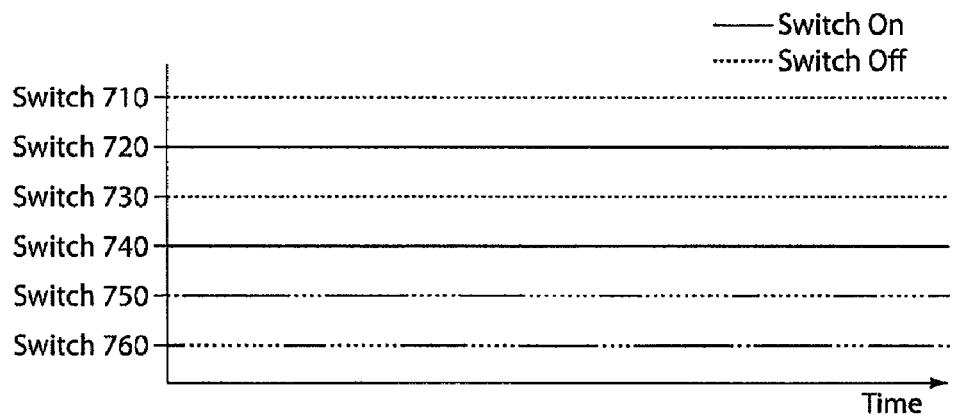

Referring also to FIG. 8, the PWM controller 775 can cause the DC/AC converter 700 to operate in three states. The first state corresponds to times when the voltage output provided at the output 702 is above one-third of the voltage provided on the input 765 (e.g., voltage on the input is 450 V, then the first state corresponds to times when the output is above 150 V). The second state corresponds to times when the output provided is at the output 702 is between one-third of the voltage provided on the input 765, and one-third of the voltage provided in the input 768 (e.g., −150 V and 150 V). The third state corresponds to times when the output voltage provided at the output 702 is below one-third of the voltage provided on the input 768 (e.g., below −150 V). The PWM controller 775 is configured such that during the first state, the switches 730 and 750 are switched on, the switches 740 and 760 are switched off, and the switches 710 and 720 are switching (see FIG. 9A). The PWM controller 775 is configured such that during the second state, the switches 720 and 750 are switched on, the switches 710 and 760 are switched off, and the switches 730 and 740 are switching (FIG. 9B). The PWM controller 775 is configured such that during the third state, the switches 720 and 740 are switched on, the switches 710 and 730 are switched off, and the switches 750 and 760 are switching (FIG. 9C). In the first state, the switching configuration of the switches 710, 720, 730, 740, 750, and 760 is configured to cause a square wave voltage at a node 780 that varies between 450 V and 150 V, with a varying duty cycle. For example, the duty cycle of the square wave can vary according to which portion of which state the DC/AC converter is operating in (e.g., as the voltage of the output approaches 450 V in the first state, the duty cycle of the square wave approaches 100%). In the second state, the switching configuration of the switches 710, 720, 730, 740, 750, and 760 is configured to cause a square wave voltage at the node 780 that varies between 150 V and −150 V, with a varying duty cycle. In the third state, the switching configuration of the switches 710, 720, 730, 740, 750, and 760 is configured to cause a square wave voltage at the node 780 that varies between −150 and −450 V, with a varying duty cycle.

The filter 770 is configured to filter the output provided at the node 772 into a substantially AC output voltage which is provided to the output 702. The filter 770 can be an L-C low pass filter, although other filter configurations are possible.

Figure 10:
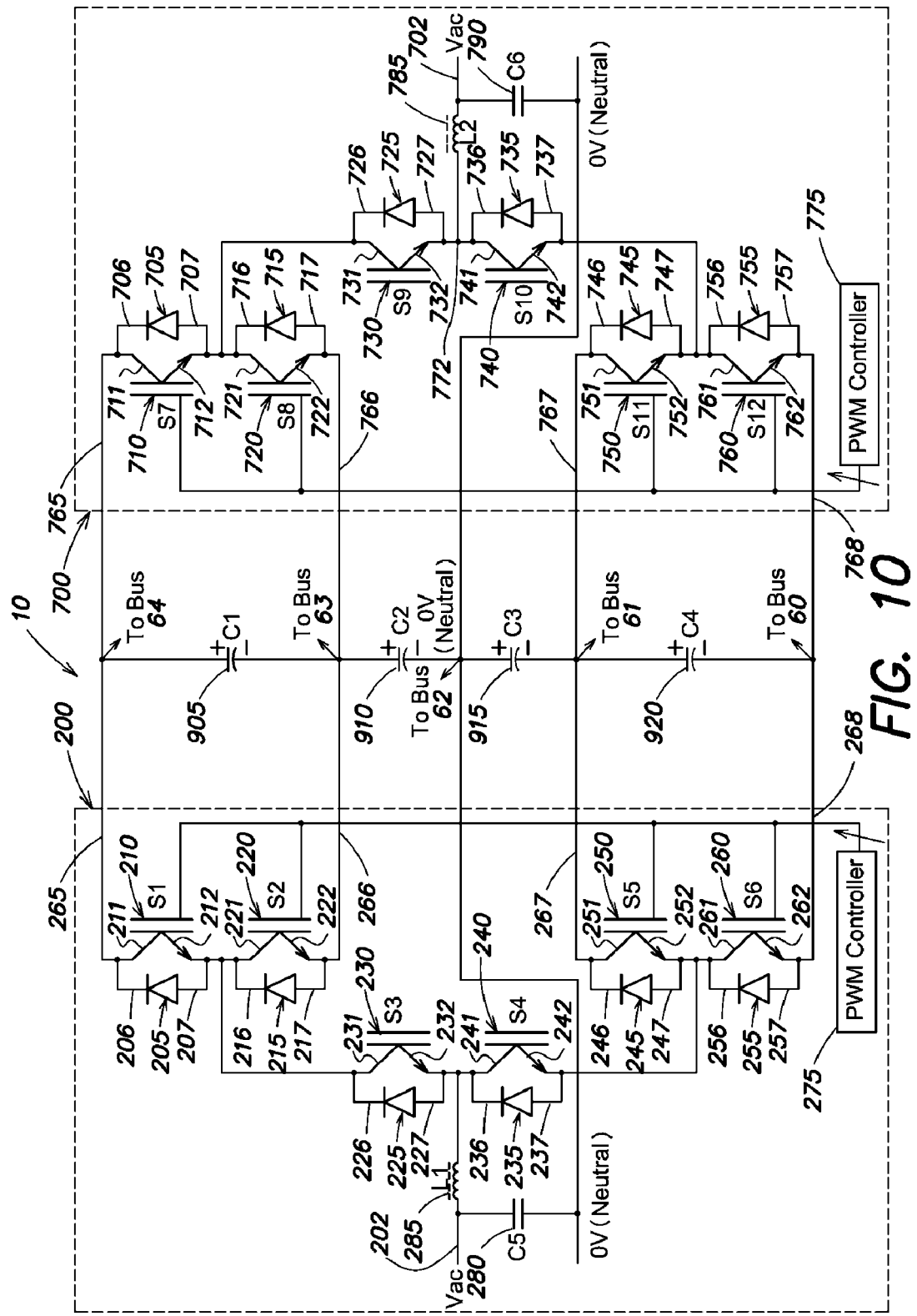
FIG. 10 is a circuit diagram of an AC/AC converter.

Referring to FIG. 10, the AC/AC module 10 includes the AC/DC converter 200, the DC/AC converter 700, capacitors 905, 910, 915, and 920. The outputs 265, 266, 267, and 268 are coupled to the inputs 765, 766, 767, and 768, respectively. The capacitor 905 is coupled between the junction of the output 265 and the input 765 and the junction of the output 266 and the input 766. The capacitor 910 is coupled between the junction of the output 266 and the input 766 and the neutral connection. The capacitor 915 is coupled between the neutral connection and the junction of the output 267 and the input 767. The capacitor 920 is coupled between the junction of the output 267 and the input 767 and the junction of the output 268 and the input 768. Furthermore, the junction of the output 265 and the input 765 is coupled to the bus 64. The junction of the output 266 and the input 766 is coupled to the bus 63. The junction of the output 267 and the input 767 is coupled to the bus 61. The junction of the output 268 and the input 768 is coupled to the bus 60.

The capacitors 905, 910, 915, and 920 are configured to store energy for a short period of time when, for example, the frequency of the power signal provided to the input 202 differs from the signal frequency provided by the output 702 and to reduce ripple current present on the buses 60, 61, 62, 63, and/or 64. The AC/AC module 10 is configured to, in operation, induce a 300 V potential across the capacitors 905 and 920, and a 150 V potential across the capacitors 910 and 915.

Figure 11:
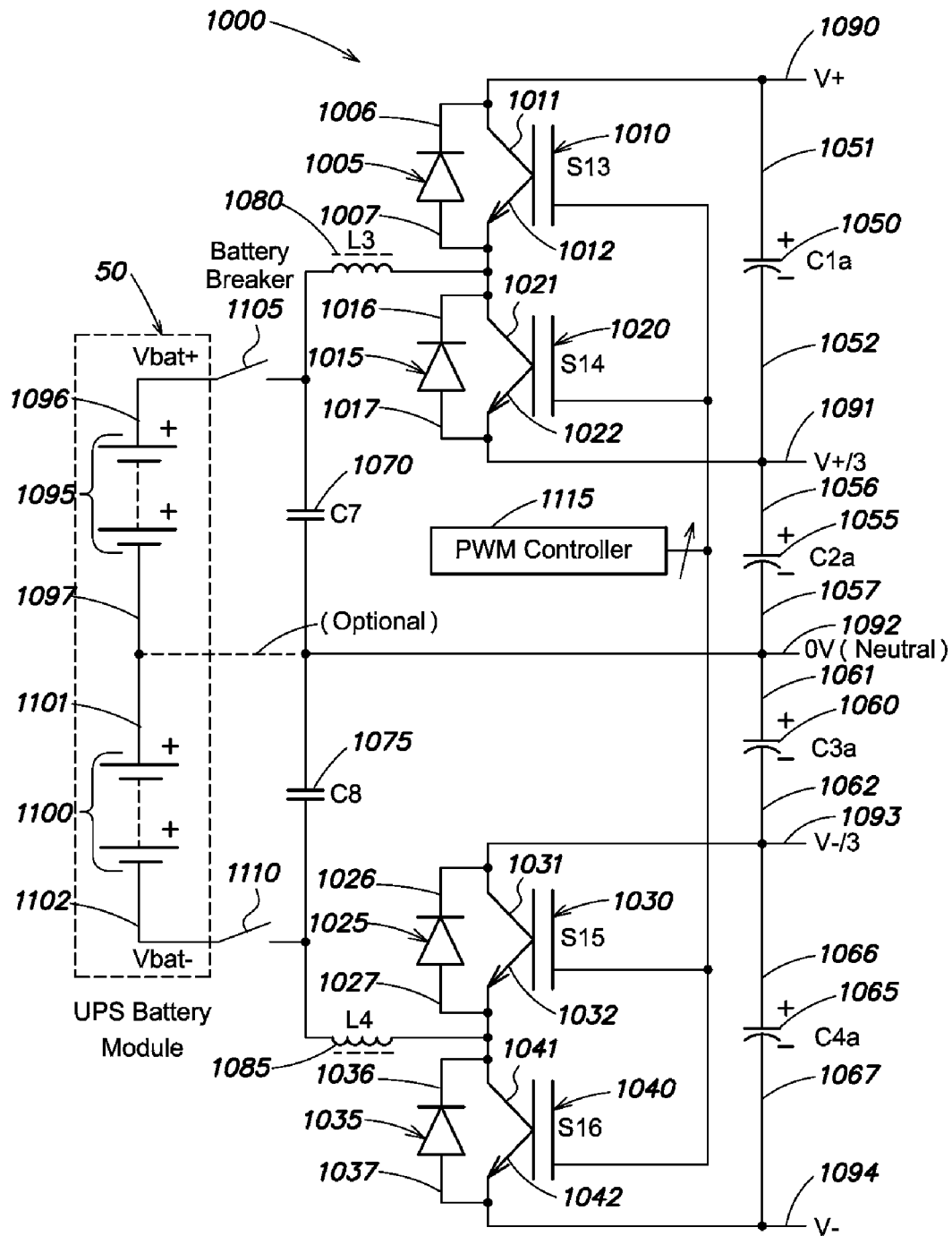
FIG. 11 is a circuit diagram of a DC/DC converter.

Referring to FIGS. 1 and 11, a DC/DC converter 1000 (e.g., an exemplary embodiment of the DC/DC converter 41) is coupled to the battery 50 and includes diodes 1005, 1015, 1025, and 1035, switches 1010, 1020, 1030, and 1040, capacitors 1050, 1055, 1060, 1065, capacitors 1070, and 1075, and inductors 1080 and 1085. The switches 1010, 1020, 1030, and 1040 are preferably IGBTs, although other switches can be used. Preferably, the diodes are fast or ultra fast reverse recovery diodes (e.g., as can be used elsewhere in the system 5). A cathode 1006 of the diode 1005 is coupled to a collector 1011 of the switch 1010, and is further coupled to the node 1090. An anode 1007 of the diode 1005, an emitter 1012 of the switch 1010, a cathode 1016 of the diode 1015, and a collector 1021 of the switch 1020 are coupled together. An anode 1017 of the diode 1015 and an emitter 1022 of the switch 1020 coupled together, and are further coupled to the node 1091. A positive terminal 1051 of the capacitor 1050 is coupled to the node 1090 and a negative terminal 1052 of the capacitor 1050 is coupled to the node 1091. The capacitor 1070 and the inductor 1080 are coupled between the junction of the anode 1007, the emitter 1012, the cathode 1016, and the collector 1021 and the node 1092. Preferably, the inductor 1080 is coupled to the junction of the anode 1007, the emitter 1012, the cathode 1016, and the collector 1021, and the capacitor 1070 is coupled to the node 1092. A positive terminal 1056 of the capacitor 1055 is coupled to the node 1091, and a negative terminal 1057 of the capacitor 1055 is coupled to the node 1092. A cathode 1026 of the diode 1025 is coupled to a collector 1031 of the switch 1030, and is further coupled to the node 1093. An anode 1027 of the diode 1025, an emitter 1032 of the switch 1030, a cathode 1036 of the diode 1035, a collector 1041 of the switch 1040 are coupled together. An anode 1037 of the diode 1035 and an emitter 1042 of the switch 1040 are coupled together, and are further coupled to the node 1094. A positive terminal 1066 of the capacitor 1065 is coupled to the node 1093 and a negative terminal 1067 of the capacitor 1065 is coupled to the node 1094. The capacitor 1075 and the inductor 1085 are coupled between the junction of the anode 1027, the emitter 1032, the cathode 1036, and the collector 1041 and the node 1092. Preferably, the inductor 1085 is coupled to the junction of the anode 1027, the emitter 1032, the cathode 1036, and the collector 1041, and the capacitor 1075 is coupled to the node 1092. A positive terminal 1061 of the capacitor 1060 is coupled to the node 1092, and the negative terminal 1062 of the capacitor 1060 is coupled to the node 1093. The nodes 1090, 1091, 1092, 1093, and 1094 are configured to be coupled to the buses 64, 63, 62, 61, and 60, respectively. The switches are configured to be coupled to a PWM controller 1115. While the capacitors 1050, 1055, 1060, and 1065 have been assigned different reference numbers in the figures, the capacitors 1050, 1055, 1060, and 1065 can be the capacitors 905, 910, 915, and 920, respectively.

The DC/DC converter 1000 is configured provide power to and receive power from batteries 1095 and 1100. The batteries 1095 and 1100 are coupled to the DC/DC converter 1000 via circuit breakers 1105 and 1110. A positive terminal 1096 of the battery 1095 is coupled to the junction of the capacitor 1070 and the inductor 1080 via the breaker 1105. A negative terminal 1097 of the battery 1095 is coupled to a positive terminal 1101 of the battery 1100. A negative terminal 1102 of the battery 1100 is coupled to the junction of the capacitor 1075 and the inductor 1085 via the breaker 1110. Optionally, the negative terminal 1097 of the battery 1095 and the positive terminal 1101 of the battery 1100 can be coupled to the node 1092 to reduce the maximum voltage across the battery breakers. Preferably, the batteries 1095 and 1100 are configured to receive and provide a voltage that is between the peak voltage of the system 5 (e.g., the voltage present on the bus 64) and one-third of the peak voltage of the system 5 (e.g., the voltage present on the bus 63). For example, the batteries 1095 and 1100 can be configured to provide about 288 V.

The DC/DC converter 1000 is configured to operate in two states, a charge state and a discharge state. During the charge state the DC/DC converter 1000 acts as a buck converter and receives a first DC voltage set from the buses 60, 61, 63, and 64 and to provide a voltage of a first level to the batteries 1095 and 1100. During the discharge state, the DC/DC converter 1000 receives DC power of a second level and provides a second DC voltage set to the buses 60, 61, 63, and 64, respectively. The first voltage set and the second voltage set can be substantially equal. The first DC voltage and the second DC voltage can be substantially equal. During the charge state, the DC/DC converter 1000 actively charges the batteries 1095 and 1100, and/or provides a float charge (e.g., to maintain a charge in a fully charged battery).

The switches 1010, 1020, 1030, and 1040 are configured to be controlled by a PWM controller 1115. Preferably, a configuration of the PWM controller 1115 is similar to the PWM controller 275, although other configurations are possible. Preferably, the switches 1010 and 1040 are controlled to switch in a similar manner (e.g., both of the switches 1010 and 1040 are switched on at about the same time) and the switches 1020 and 1030 are controlled to switch in a similar manner (e.g., both of the switches 1020 and 1030 are switched on at about the same time). If, however, the junction of the negative terminal 1097 and the positive terminal 1101 is coupled to the node 1092, each of the switches 1010, 1020, 1030, and 1040 can be switched independently. The PWM controller 1115 is configured to vary the charging voltage of the battery 1095 by varying the duty cycle of the switch 1010. Likewise, the PWM controller 1115 can vary the charging voltage of the battery 1100 by varying the duty cycle the switch 1040.

When the DC/DC converter 1000 is operating in the charge state, the PWM controller 1115 causes the DC/DC converter 1000 to operate as a buck converter by repeatedly switching the switches 1010 and 1040 while keeping the switches 1020 and 1030 switched off. When the switches 1010 and 1040 are on, the DC/DC converter 1000 the voltages present at the nodes 1090 and 1094 charge the inductors 1080 and 1085. When the switches 1010 and 1040 are off, the choke currents (e.g., caused by the inductors 1080 and 1085 discharging) free-wheel through the diodes 1015 and 1025. The DC/DC converter 1000 is configured to step-down the voltages present at the nodes 1090 and 1094 by varying the duty cycle at which the switches 1010 and 1040 are switched. For example, as the duty cycle of the switching signal provided by the PWM controller 1115 increases towards 1, the voltage provided to the batteries 1095 and 1100 increases towards the voltage present at the nodes 1090 and 1094. The capacitors 1070 and 1075 are configured to reduce ripple current by filtering out high frequency components of the signal provided to the batteries 1095 and 1110.

When the DC/DC converter 1000 is operating in the discharge state, the PWM controller 1115 causes the DC/DC converter 1000 to operate as a buck-boost converter by repeatedly switching the switches 1020 and 1030 while keeping the switches 1010 and 1040 off. For example, the DC/DC converter 1000 provides a stepped-up voltage from the batteries 1095 and 1100 to the nodes 1090 and 1094, and provides a stepped-down voltage to the nodes 1091 and 1093. When the switches 1020 and 1030 are on, the batteries 1095 and 1100 cause the inductors 1080 and 1085 store energy. When the switches 1020 and 1030 are off, the energy stored in the inductors 1080 and 1085 (and energy provided by the batteries 1095 and 1100) is discharged (e.g., freewheels) through the diodes 1005 and 1035, respectively. The DC/DC converter 1000 is configured to step-up the voltage provided by the batteries 1095 and 1100 to the desired level by varying the duty cycle at which the switches 1020 and 1030 are switched. For example, as the duty cycle of the switching signal provided by the PWM controller 1115 increases towards 1, the voltage provided at the nodes 1090, 1091, 1093, and 1094 increases. The DC/DC converter 1000 is also configured to step-down the voltage provided by the batteries 1095 and 1100 and to provide the stepped-down voltage to the nodes 1091 and 1093. The DC/DC converter 1000 is configured to provide the stepped down voltage to the nodes 1091 and 1093 in a manner similar to that described above. The capacitors 1050, 1055, 1060, and 1065 are configured to filter out high-frequency components of the signals on the nodes 1090, 1091, 1093, and 1094.

Figure 12:
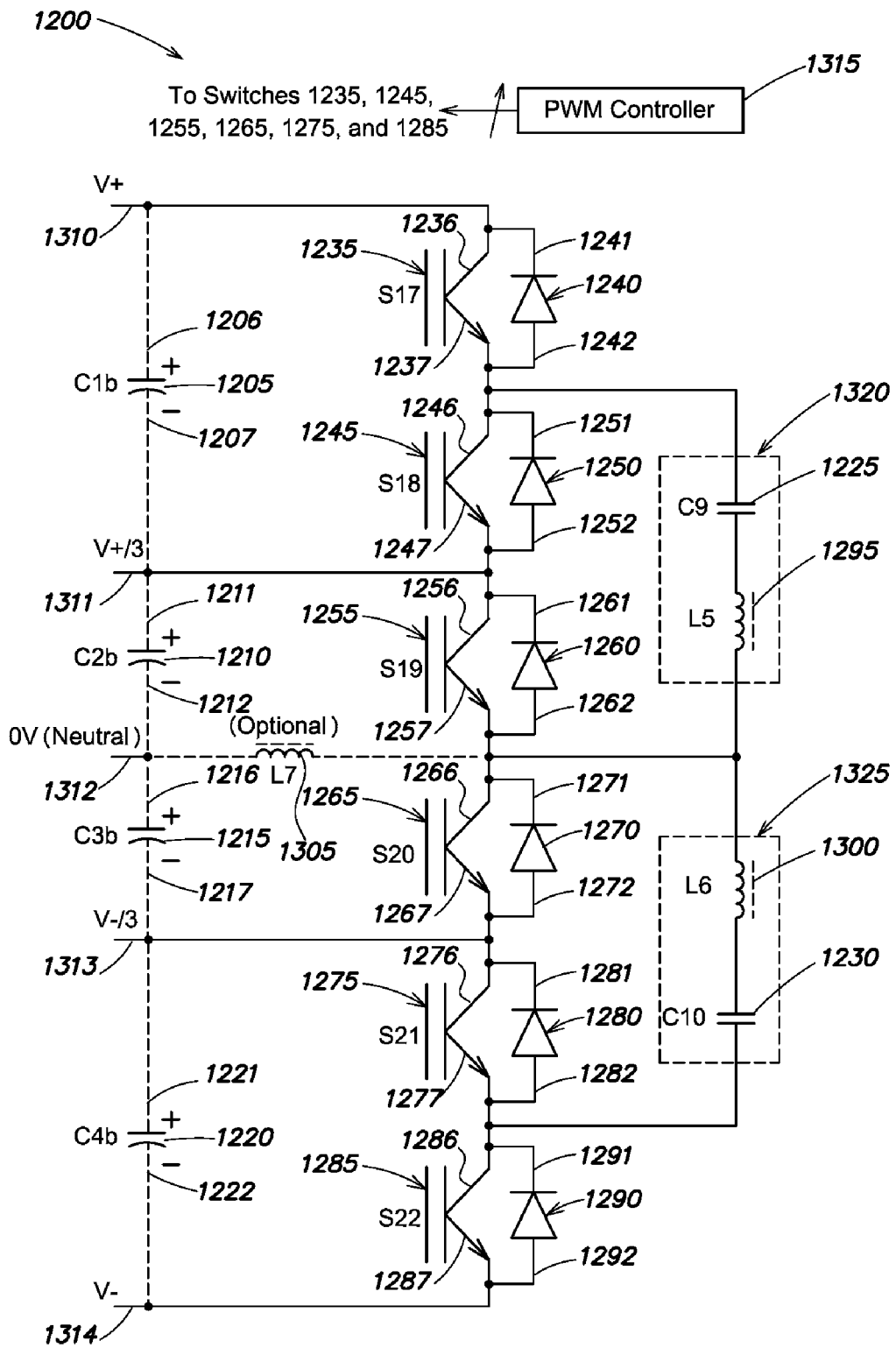
FIG. 12 is a circuit diagram of a DC bus balancer.

Referring to FIGS. 1 and 12, an example of the DC bus balancer 42, here a DC bus balancer 1200, includes capacitors 1205, 1210, 1215, 1220, 1225, and 1230, switches 1235, 1245, 1255, 1265, 1275, and 1285, diodes 1240, 1250, 1260, 1270, 1280, and 1290, and inductors 1295, 1300, and 1305. A positive terminal 1206 of the capacitor 1205, a collector 1236 of the switch 1235, and a cathode 1241 of the diode 1240 are coupled to a node 1310. An emitter 1237 of the switch 1235 an anode 1242 of the diode 1240 a collector 1246 of the switch 1245 and a cathode 1251 of the diode 1250 are coupled together. An emitter 1247 of the switch 1245, an anode 1252 of the diode 1250, a collector 1256 of the switch 1255, and a cathode 1261 of the diode 1260 are coupled together and are further coupled to a node 1311. An emitter 1257 of the switch 1255, an anode 1262 of the diode 1260, a collector 1266 of the switch 1265, and a cathode 1271 of the diode 1270 are coupled together. An emitter 1267 of the switch 1265, an anode 1272 of the diode 1270, a collector 1276 of the switch 1275, a cathode 1281 of the diode 1280 are coupled together, and are further coupled to the node 1313. An emitter 1277 of the switch 1275 an anode 1282 of the diode 1280, a collector 1286 of the switch 1285, and a cathode 1291 of the diode 1290 are coupled together. An emitter 1287 of the switch 1285 and an anode 1292 of the diode 1290 are coupled together, and are further coupled to the node 1314. A positive terminal 1206 of the capacitor 1205 is coupled to the node 1310 and a negative terminal 1207 of the capacitor 1205 is coupled to the node 1311. A positive terminal 1211 of the capacitor 1210 is coupled to the node 1311 and a negative terminal 1212 of the capacitor 1210 is coupled to the node 1312. A positive terminal 1216 of the capacitor 1215 is coupled to the node 1312 and a negative terminal 1217 of the capacitor 1215 is coupled to the node 1313. A positive terminal 1221 of the capacitor 1220 is coupled to the node 1313 and a negative terminal 1222 of the capacitor 1220 is coupled to the node 1314. The capacitor 1225 and the inductor 1295 are coupled in a series between the junction of the diodes 1240 and 1250 and the junction of the diodes 1260 and 1270. The inductor 1300 and the capacitor 1230 are coupled between the junction of the diodes 1260 and 1270 and the junction of the diodes 1280 and 1290. Thus, the capacitor 1225, the inductor 1295, the inductor 1300, and the capacitor 1230 are coupled in series between the junction of the diodes 1240 and 1250 and the diodes 1280 and 1290. The inductor 1305 is coupled between the node 1312 and the junction of the diodes 1260 and 1270. The inductor 1305, however, is optional. For example, if the AC/DC converters 11, 21, and 31 are configured to control an amount of power drawn from the AC input in respective positive and negative half-cycles. The DC bus balancer 1200 can be configured to reduce (and possibly eliminate) the desire to control power draw on the AC input using the AC/DC converters 11, 21, and 31 (e.g., in order to balance the buses 60, 61, 62, 63 and 64) by including the inductor 1305. The combination 1225 and the inductor 1295 define a resonant tank 1320, and the combination of the capacitor 1230 and the inductor 1300 define a resonant tank 1325.

Figure 13:
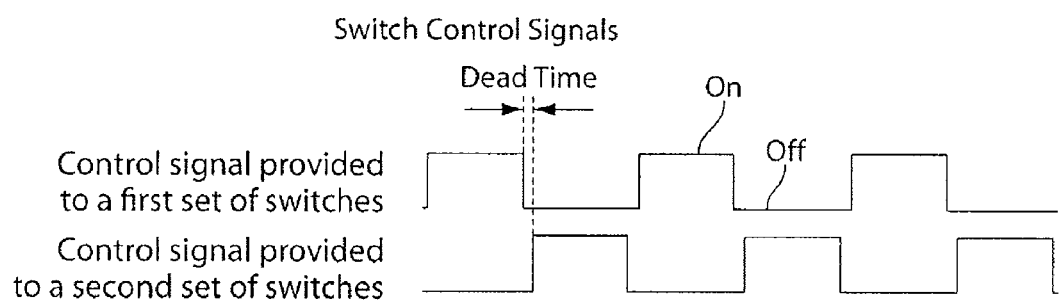
FIG. 13 is a graph representing exemplary signals for controlling switches included in the DC bus balancer of FIG. 12.

A PWM controller 1315 is coupled to each of the switches 1235, 1245, 1255, 1265, 1275, and 1285. The PWM 1315 controller is preferably configured in a manner similar to the PWM controller 275. For example, the PWM controller 1315 includes multiple comparators which are each configured to receive multiple control signals. The control signals are selected such that the desired switching sequence (e.g., as described herein in the DC bus balancer 42) is obtained. The PWM controller 1315 is configured to provide control signals that preferably have a constant frequency and duty cycle, although other configurations as possible. The control signals provided to the switches 1235, 1255, and 1275 are preferably substantially identical, and the control signals provided to the switches 1245, 1265, and 1285 are preferably substantially identical. The control signals preferably have a duty cycle of about 50%, although other duty cycles are possible. Referring also to FIG. 13, the PWM controller 1315 is configured to insert "dead time" between the switching of the switches 1235, 1245, 1255, 1265, 1275, and 1285 such that the switches being switched off are substantially completely off before other switches are switched on. The use of dead time, however, is optional. The PWM controller 1315 is configured to provide a control signal such that the switches 1235, 1245, 1255, 1265, 1275 and 1285 switch at a frequency about equal to a resonant frequency of the resonant tanks 1320 and 1325, although other frequencies are possible.

The DC bus balancer 1200 is configured to balance and maintain desired voltages on the buses 60, 61, 62, 63 and 64 by moving energy stored in the capacitors 1205, 1210, 1215, and 1220 onto the buses 64, 63, 61, and 60, as appropriate. The switches 1235, 1245, 1255, 1265, 1275, and 1285 are configured to be switched by the PWM controller 1315. The PWM controller 1315 is configured to control the switches to be first and second states. In the first state, the switches 1235, 1255, and 1275 are on while the switches 1245, 1265, and 1285 are off. In the second state the switches 1235, 1255, and 1265 are off while the switches 1245, 1265, and 1285 are on. Due to these switch states, voltages within the DC bus balancer 1200 alternate as shown in Table 1.

| Junction of | First State Voltage | Second State Voltage |
|---|---|---|
| Switches 1235 and 1245 | Voltage at node 1310 | Voltage at node 1311 |
| Switches 1255 and 1265 | Voltage at node 1311 | Voltage at node 1313 |
| Switches 1275 and 1285 | Voltage at node 1313 | Voltage at node 1314 |

Thus, when the nodes 1310, 1311, 1313, and 1314 provide 450 V, 150 V, −150 V, and −450 V, respectively, then each of the junctions described in Table 1 alternate by about 300 V (peak to peak). The remainder of the discussion of the DC bus balancer 1200 assumes that the buses 64, 63, 61, and 60 provide 450 V, 150 V, −150 V, and −450 V, respectively (relative to the neutral).

During balanced operation of the DC bus balancer 1200 (e.g, the voltages on the nodes 1310, 1311, 1312, 1313, and 1314 are at desired levels), the signal present at each of the junctions described in Table 1 will be substantially square. Further, during balanced operation, the voltage swings at the junctions described in Table 1 will be substantially in phase with each other and have substantially the same amplitude. The voltage differences across the resonant tanks 1320 and 1325 are preferably about equal to one-third of the total DC voltage between the bus 60 and 64 (e.g., 300 V). The capacitors 1225 and 1230 are configured to charge to the potential placed across the resonant tanks 1320 and 1325, respectively (e.g., 300 V).

The DC bus balancer 1200 is configured to compensate for unbalanced voltages on the nodes 1310, 1311, 1312, 1313, and 1314 using energy stored in the resonant tanks 1320 and 1325. During unbalanced operation of the DC bus balancer 1200, the amplitude of the square-wave voltages induced across the junctions described in Table 1 can be uneven, which can cause a square wave voltage to appear across one or more of the resonant tanks 1320 and 1325. Each of the resonant tanks 1320 and 1325 are configured such that, as a voltage appears across the resonant tanks 1320 and 1325, a current flows through each of the resonant tanks 1320 and 1325. The resonant tanks 1320 and 1325 are configured to have a low impedance (e.g., approaching zero) such that even a small voltage potential across each of the resonant tanks 1320 and/or 1325 can cause a large current flow through the resonant tanks 1320 and/or 1325. The impedance of the resonant tanks 1320 and 1325 can be a function of the frequency at which the switches 1235, 1245, 1255, 1265, 1275, and 1285 are switched at (or vice versa). For example, as the switching frequency approaches being equal to the resonant frequency of the resonant tanks 1320 and 1325, the impedance of the resonant tanks 1320 and 1325 approaches zero. The resonant tanks 1320 and 1325 are configured to cause a current to flow that can move energy from the capacitors 1205, 1210, 1215, and/or 1220 having voltage(s) higher than the preferred voltage levels of 300 V and 150 V, respectively, towards the capacitors having voltage(s) lower than the preferred voltage levels. The switches (e.g., of the switches 1235, 1245, 1255, 1265, 1275, and 1285) that are coupled across the capacitor (e.g., of the capacitors 1205, 1210, 1215, and/or 1220) having the higher voltage are configured to act as a generator and create an AC current through the resonant tanks 1320 and/or 1325 to establish a flow of real power towards the capacitor (e.g., of the capacitors 1205, 1210, 1215, and/or 1220) having the lowest voltage. The DC bus balancer 1200 is configured such that the current flow through the resonant tanks 1320 and 1325 preferably starts when the voltage difference between imbalanced capacitors exceeds a forward voltage drop of the respective diodes 1240, 1250, 1260, 1270, 1280, and 1290 (e.g., a few volts). Preferably, as the frequency that the switches 1235, 1245, 1255, 1265, 1275, and 1285 are switched at approaches the resonant frequency of the resonant tanks 1225 and 1230, zero-crossings of the induced current occur closer to the dead time between the first and second states, which can reduce switching losses.

Figure 14:
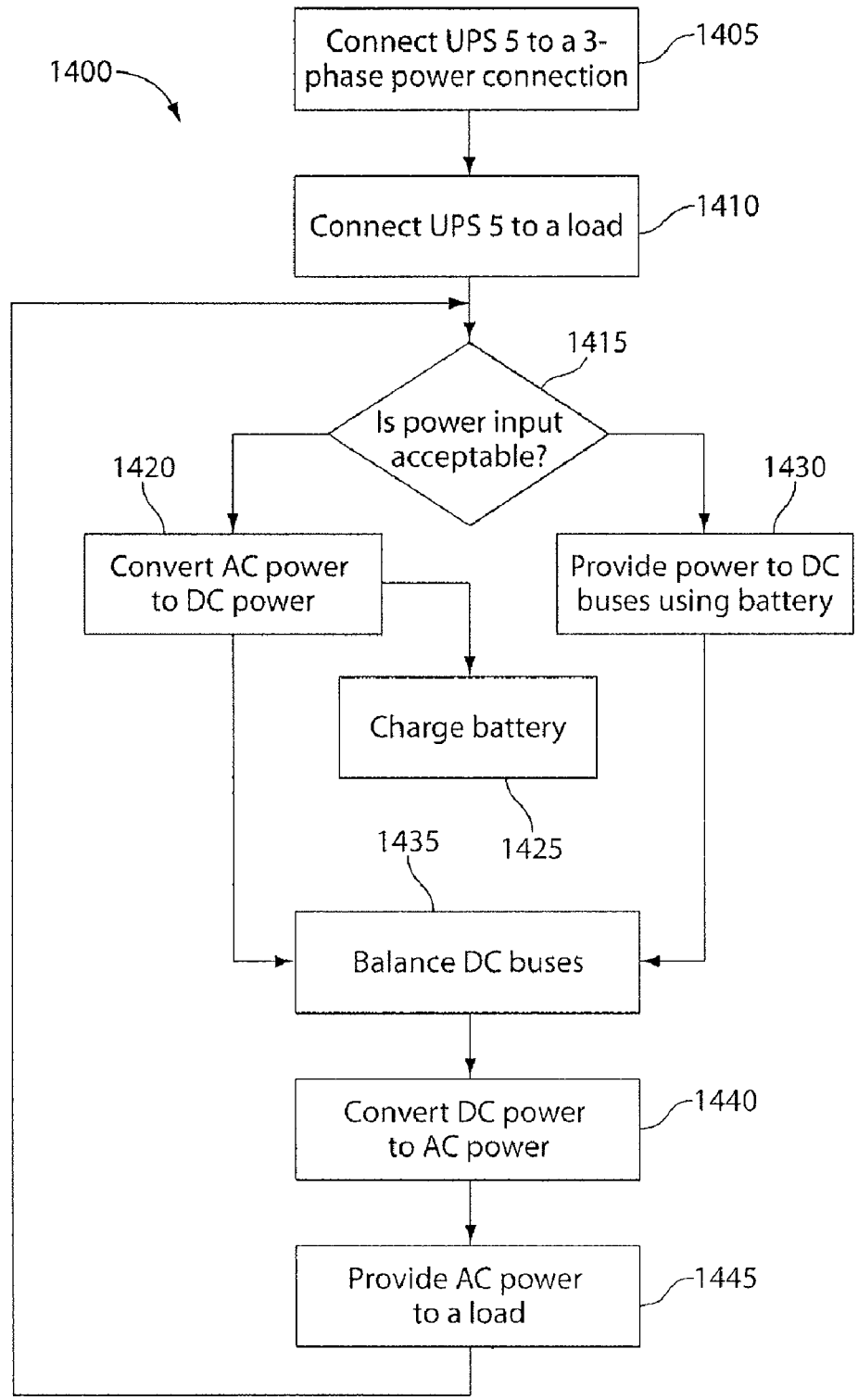
FIG. 14 is a flowchart of a process for providing power from the 3-phase UPS shown in FIG. 1.

In operation, referring to FIG. 14, with further reference to FIGS. 1-13, a process 1400 for providing an uninterruptible power to a load using the UPS 5 includes the stages shown. The process 1400, however, is exemplary only and not limiting. The process 1400 may be altered, e.g., by having stages added, removed, altered, or rearranged. Furthermore, while portions of the process 1400 are shown as successive steps, certain stages can occur in parallel (e.g., stages 1435 and 1440).

At stage 1405, the UPS 5 is coupled to a 3-phase power feed. The AC/AC modules 10, 20 and 30 are coupled to the X, Y, and Z-phases of the 3-phase power feed, respectively. The AC/AC modules 10, 20, and 30 are further coupled to a neutral connection of the 3-phase power feed. The power feed provides 3-phase AC power to the UPS 5.

At stage 1410, the UPS 5 is coupled to one or more loads. The UPS 5 can be coupled to a 3-phase load (e.g., the AC/AC module 10 provides the X-phase, AC/AC module 20 provides the Y-phase, and AC/AC module 30 provides the Z-phase). Alternatively, the UPS 5 can be coupled to one or more single-phase loads. For example, each of the AC/AC modules 10, 20, and 30 can provide single phase power to one or more loads.

At stage 1415, the UPS 5 determines whether the AC power feed is acceptable. If the UPS 5 determines that the AC input power is acceptable, then the process 1400 proceeds to stage 1420. If the UPS 5 determines that the input power is unacceptable, e.g., has stopped and/or become unstable (e.g., a low-voltage condition), then the process 1400 proceeds to stage 1430.

At stage 1420, the AC/DC modules 11, 21, and 31 convert the incoming AC power to DC power, which is provided to the buses 60, 61, 63, and 64. The AC/DC modules 11, 21, and 31 are initialized (e.g., the switched are switched to the state corresponding to a power signal being provided) upon startup, or upon suitable power being provided to the UPS 5. While the following discussion focuses on the AC/DC module 11, the operation of the AC/DC modules 21 and 31 can be similar. The AC/DC module 11 processes the input AC power using a combined low-pass filter and a boost converter (i.e., the combination of the capacitor 280 and the inductor 285). The PWM controller 275 switches the switches 210, 220, 230, 240, 250, and 260 as a function of the power signal being received by the AC/DC module 11. For example, the PWM controller 275 causes the switches 210, 220, 230, 240, 250, and 260 to operate in one of three states. In the first state, the PWM controller 275 toggles the switches 210 and 220 in a mutually exclusive manner, maintains the switches 230 and 250 in an on position, and maintains the switches 240 and 260 in an off position. In the second state, the PWM controller 275 maintains the switches 210 and 260 in an off position, maintains the switches 220 and 250 in an on position, and toggles the switches 230 and 240 is a mutually exclusive manner. In the third state, the PWM controller maintains the switches 210 and 230 in an off position, maintains the switches 220 and 240 in an on position, and toggles the switches 250 and 260 in a mutually exclusive manner. The PWM controller 275 causes the AC/DC converter 11 to operate in the first state when the AC input provided to the AC/DC module 11 is greater than one-third of the voltage provided at the output 265. The PWM controller 275 causes the AC/DC converter 11 to operate in the second state when the AC input provided to the AC/DC module 11 is between one-third of the voltage provided at the output 265 and one-third of the voltage provided at the output 268. The PWM controller 275 causes the AC/DC converter 11 to operate in the third state when the AC input provided to the AC/DC module 11 is below one-third of the voltage provided at the output 268.

At stage 1425, the DC/DC converter 1000 charges the battery 50. The DC/DC converter 1000 receives a first set of DC voltages from the buses 60, 61, 63, and 64. When the UPS 5 is receiving suitable power from the power feed, the DC/DC converter 1000 converts the first voltage set to a first DC voltage that is provided to the battery 50. The voltage provided to the battery 50 is between the voltage present on the bus 64 and one-third of the voltage provided on the bus 64.

The PWM controller 1115 causes the DC/DC converter 1000 to act as a Buck converter converting the first voltage set into the first voltage. The PWM controller 1115 causes the switches 1020 and 1030 to be maintained in an off position, while the switches 1010 and 1040 are substantially simultaneously switched on and off. Each time the switches 1010 and 1040 are switched on, the inductors 1080 and 1085 charge and the batteries 1095 and 1100 receive a voltage that is substantially equal to the first voltage. Each time the switches 1010 and 1040 are switched off, the inductors 1080 and 1085 discharge (e.g., current freewheels through the diodes 1015 and 1025) and provide substantially the first voltage to the batteries 1095 and 1100. Preferably, the switches 1010 and 1040 are switched to an on state prior to the inductors 1080 and 1085 completely discharging.

At stage 1430, the PWM controller 1115 causes the DC/DC converter 1000 to act as a boost converter converting the second voltage into the second voltage set. The PWM controller 1115 causes the switches 1020 and 1030 to substantially simultaneously switch on and off while the switches 1010 and 1040 are maintained in an off position. Each time the switches 1020 and 1030 are switched on, the inductors 1080 and 1085 charge using power from the batteries 1095 and 1100. Each time the switches 1020 and 1030 are switched off, the inductors 1080 and 1085 discharge and a current freewheels through the diodes 1005 and 1035 (e.g., caused by the energy stored in the batteries 1095 and 1100 and the inductors 1080 and 1085). Preferably, the switches 1020 and 1030 are switched to an on state prior to the inductors 1080 and 1085 completely discharging. The capacitors 1070 and 1075 can be used to reduce ripple current in the power provided to the nodes 1090, 1091, 1093, and 1094. Furthermore, the UPS switches are set to a state to receive DC power from the battery 50. For example, upon detecting that the AC power feed is unavailable and/or unstable, the connection 13 is decoupled from the buses 64, 63, 61, and 60 by configuring all switches in the AC/DC modules 11 to an off position. Likewise, the operation of the AC/DC converters 21 and 31 is similar.

At stage 1435, the DC bus balancer 1200 balances the voltages present on the buses 60, 61, 63, 64. While the stage 1435 is shown as a stage placed between other stages, the DC bus balance 1200 balances the voltages present on the buses 60, 61, 63, and 64 parallel with other stages during operation of the UPS 5. The DC bus balancer 1200 balances and maintains the desired voltages on the buses 60, 61, 62, 63, and 64 by moving energy stored in the capacitors 1205, 1210, 1215, and 1220 onto the buses 64, 63, 61, and 60, as appropriate. The switches 1235, 1245, 1255, 1265, 1275, and 1285 are switched by the PWM controller 1315. The PWM controller 1315 switches the switches 1235, 1245, 1255, 1265, 1275, and 1285 in first and second states. In the first state, the switches 1235, 1255, and 1275 are switched on while the switches 1245, 1265, and 1285 are set off. In the second state the switches 1235, 1255, 1265 are set off while the switches 1245, 1265, and 1285 are set on. Voltages within the DC bus balancer 1200 alternate as shown in Table 1 (shown above). Thus, when the nodes 1310, 1311, 1313, and 1314 provide 450 V, 150 V, −150 V, and −450 V, respectively, each of the junctions described in Table 1 alternate by about 300 V (peak to peak). The remainder of the discussion of the DC bus balancer stage 1435 assumes that the buses 64, 63, 61, and 60 provide 450 V, 150 V, −150 V, and −450 V, respectively (relative to the neutral).

During balanced operation of the DC bus balancer 1200 (e.g., the voltages on the nodes 1310, 1311, 1312, 1313, and 1314 are at desired levels), the signal present at each of the junctions described in Table 1 will be substantially square. Thus, during balanced operation, the voltage swings at the junctions described in Table 1 will be substantially in phase and have substantially the same amplitude. The voltage differences across the resonant tanks 1320 and 1325 are about equal to one-third of the total DC voltage between the bus 60 and the bus (e.g., 300 V). The capacitors 1225 and 1230 charge to the potential placed across the resonant tanks 1320 and 1325, respectively (e.g., 300 V).

The DC bus balancer 1200 compensates for unbalanced voltages on the nodes 1310, 1311, 1312, 1313, and 1314 using energy stored in the resonant tanks 1320 and 1325. During unbalanced operation of the DC bus balancer 1200, the amplitude of the square-wave voltages induced across the junctions described in Table 1 can be uneven, which can cause a square wave voltage to appear across one or more of the resonant tanks 1320 and 1325. As a voltage appears across each of the resonant tanks 1320 and/or 1325, current flows through each of the resonant tanks 1320 and/or 1325, respectively. The amount of current flowing in the resonant tanks 1320 and/or 1325 can be increased by reducing the impedance of the resonant tanks 1320 and 1325 (e.g., an impedance approaching zero). The PWM controller 1315 switches the switches

1235, 1245, 1255, 1265, 1275, and 1285 at a frequency such that the impedance of the resonant tanks 1320 and 1325 is reduced. For example, as the switching frequency approaches being equal to the resonant frequency of the resonant tanks 1320 and 1325, the impedance of the resonant tanks 1320 and 1325 approaches zero. When there is a voltage present across the resonant tanks 1320 and 1325 a current flows from the capacitor having the higher voltage (e.g., of the capacitors 1205, 1210, 1215, and 1220) towards the capacitor having the lower voltage (e.g., of the capacitors 1205, 1210, 1215, and 1220). The switches (e.g., of the switches 1235, 1245, 1255, 1265, 1275, and 1285) that are coupled across the capacitor having the higher voltage (e.g., of the capacitors 1205, 1210, 1215, and 1220) act as a generator and create an AC current through the resonant tanks 1320 and/or 1325 to establish a flow of real power towards the capacitor (e.g., of the capacitors 1205, 1210, 1215, and 1220) having the lowest voltage. The current flow through the resonant tanks 1320 and 1325 preferably starts when the voltage difference between the imbalanced capacitors exceeds a forward voltage drop of the respective diodes 1240, 1250, 1260, 1270, 1280, and 1290 (e.g., a few volts).

A waveform of induced current flowing in the resonant tanks 1320 and 1325 (e.g., caused by unbalanced operation of the DC bus balancer 1200) is similar to a sine wave. Preferably, as the frequency that the switches 1235, 1245, 1255, 1265, 1275, and 1285 are switched at approaches the resonant frequency of the resonant tanks 1320 and 1325, zero-crossings of the induced current occur closer to the dead time between the first and second states, which can reduce switching losses.

At stage 1440, DC power on the buses 60, 61, 63, and 64 is converted to AC power by the DC/AC converters 12, 22, and 32. Each of the DC/AC converters 12, 22, and 32 is preferably configured as the DC/AC converter 700. The DC/AC converter 700 receives power from the AC/DC converter 200, or the battery 50 via the buses 60, 61, 63, and 64. The DC/AC converter 700 generates an AC output having peak voltages about equal to the voltages present on the input 765 and the input 768. A phase of each of the DC/AC converters 12, 22, and 32 are preferably varied such that standard 3-phase power can be provided to a load.

Referring also to FIGS. 9-10, the DC/AC converter 700 converts the DC power to AC power by switching the switches 710, 720, 730, 740, 750, and 760 in a predetermined sequence. The PWM controller 775 switches the switches 710, 720, 730, 740, 750, and 760 in different sequences depending on the desired output at the output 702. When the desired output (at the output 702) is between the voltages present at the inputs 765 and 766, the PWM controller 775 actively switches the switches 710 and 720 on and off, sets to the switches 730 and 750 to an on position, and sets the switches 740 and 760 to an off position. When the desired output (at the output 702) is between the voltages present at the inputs 766 and 767 the PWM controller 775 actively switches the switches 730 and 740 on and off, sets the switches 720 and 750 to an on position, and sets the switches 710 and 760 to an off position. When the desired output (at the output 702) is between the voltages present at the inputs 767 and 768, the PWM controller 775 actively switches the switches 750 and 760 on and off, sets the switches 720 and 540 to an on position, and sets the switches 710 and 730 to an off position. In each of the three states, the duty cycle of the switches 710, 720, 730, 740, 750, and 760 that are being actively switched are varied such that the output of the filter 770 is substantially AC (e.g., as shown in FIGS. 9-10). The filter 770 (e.g., an LC low-pass filter) filters the signal provided at the node 780 into a substantially AC signal which is provided to the output 702.

At stage 1445 AC power is provided to a load. The configuration of the power that is provided to the load can vary depending on the desired operation. For example, each of the DC/AC converters 12, 22, and 32 can provide one phase of a 3-phase power connection, all or a portion of the DC/AC converters 12, 22, and 32 can provide power having a single phase, each of the DC/AC converters 12, 22, and 32 can provide single phase power to individual loads, etc.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. While three DC/AC converters are shown (e.g., DC/AC converters 12, 22, 32, and 42) a single DC/AC converter can be used if only single phase power is desired. The AC/DC and DC/AC converters can be split into multiple parallel circuits and be switches in an interleaved manner, e.g., to reduce ripple current on the buses. The voltages present on the buses 61, 62, 64, and 65 can be different from that described herein. A battery can be coupled directly to the buses 61, 63, and/or 64, without the use of a DC/DC converter. DC bus symmetry can be controlled by a modified control scheme of the AC/DC converter.

Referring to FIG. 1, while the UPS 5 is shown as including the DC/DC module 40, the DC/DC module 40 can be omitted. For example, a UPS can convert a 3-phase power feed from the first voltage to the second voltage without the presence of the DC/DC module 40.

While the description herein describes numerous separate capacitors, two or more capacitors can be combined into a single capacitor. For example, FIG. 10 shows the capacitor 905 coupled between the bus 64 and the bus 63, FIG. 11 shows the capacitor 1050 coupled between the bus 64 and the bus 63, and FIG. 12 shows the capacitor 1205 coupled between the bus 64 and the bus 63. The capacitors 905, 1050, and 1205 can be a single shared capacitor.

Referring to FIG. 2, while the AC/DC converter 200 is configured as a four-quadrant inverter providing both positive and negative DC voltages, an AC/DC converter can be arranged in other configurations. For example, an AC/DC converter can be configured as a 2-quadrant rectifier providing only positive DC voltages during the positive half-cycles of the input line voltage (and only negative DC voltages during the negative half-cycles of the input line voltage) by replacing switches 210 and 260 with diodes.

Figure 15:
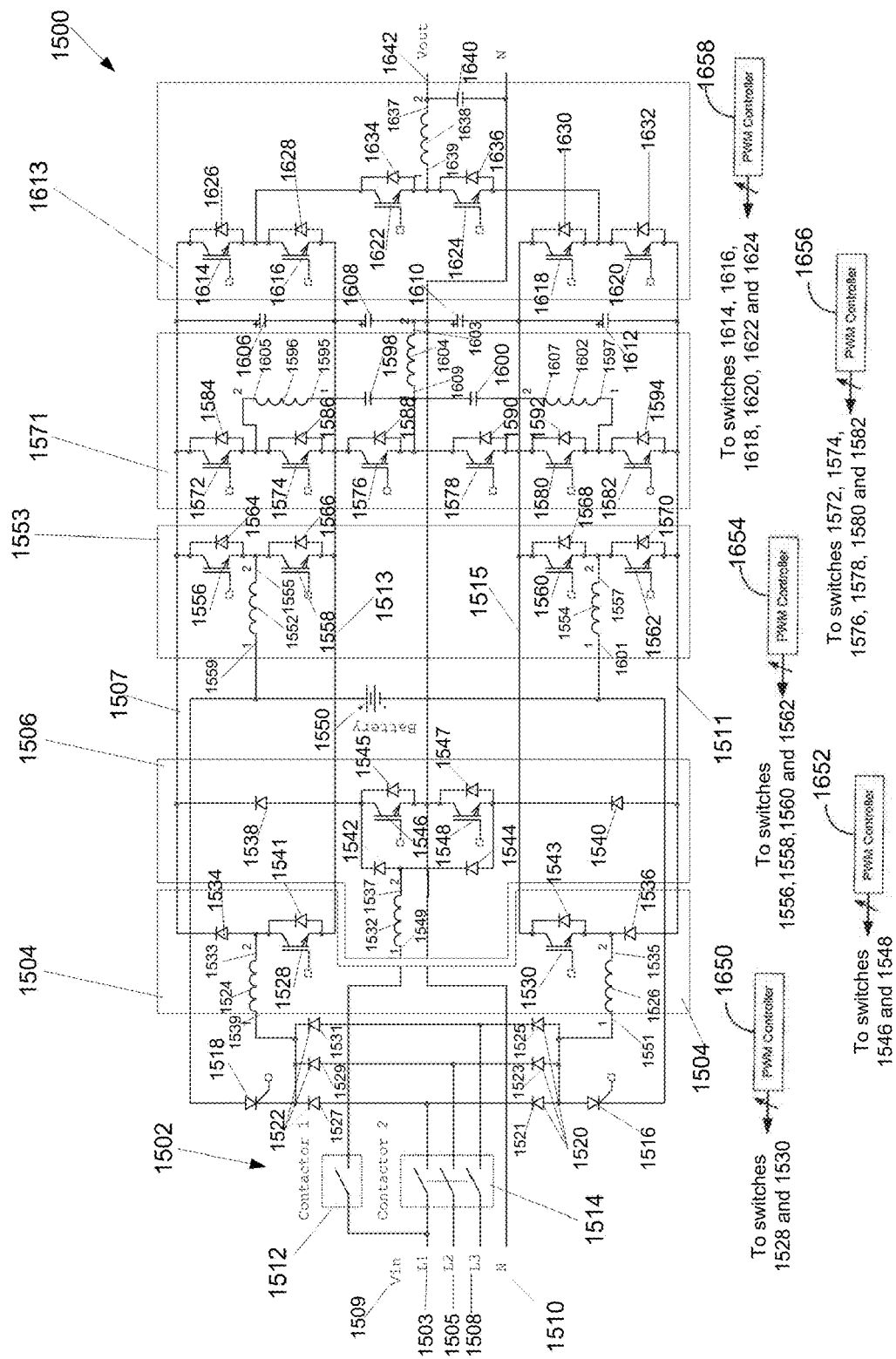
FIG. 15 is a circuit diagram of a UPS in accordance with another embodiment.

Referring to FIG. 15, another embodiment of a UPS 1500 is shown. The UPS 1500 includes an input section 1502, a first power converter 1504, a second power converter 1506, a battery 1550, a battery charger/boost circuit 1553, a bus balancer 1571, a first DC bus 1507, a second DC bus 1513, a third DC bus 1515, a fourth DC bus 1511, a neutral line 1510, a first DC bus capacitor 1606, a second DC bus capacitor 1608, a third DC bus capacitor 1610, a fourth DC bus capacitor 1612, and an DC/AC converter 1613. It should be appreciated that in various embodiments, any one of or any combination of the input section 1502, the first power converter 1504, the second power converter 1506, the battery 1550, the battery charger/boost circuit 1553, the bus balancer 1571 and the first DC bus 1507 can include solid state circuitry (for example, IGBTs) or analog circuitry.

In the embodiment illustrated in FIG. 15, the DC buses 1507 and 1513 are positive buses and the DC buses 1515 and 1511 are negative buses; however, it should be appreciated that other DC bus configurations may be used with more than four or less than four buses. In the illustrated embodiment, the first DC bus 1507 has a first positive DC bus voltage, the second DC bus 1513 has a second positive DC bus voltage, the fourth DC bus 1511 has a first negative DC bus voltage, and the third DC bus 1515 has a second negative DC bus voltage. According to one embodiment, a magnitude of the second positive DC bus voltage is a third of a magnitude of the first positive DC bus voltage and a magnitude of the second negative DC bus voltage is a third of a magnitude of the first negative DC bus voltage.

Also, in the embodiment illustrated in FIG. 15, the first DC bus capacitor 1606 is coupled between the first DC bus 1507 and the second DC bus 1513; the second DC bus capacitor 1608 is coupled between the second DC bus 1513 and the neutral line 1510; the third DC bus capacitor 1610 is coupled between the neutral line 1510 and the third DC bus 1515; and the fourth DC bus capacitor 1612 is coupled between the third DC bus 1515 and the fourth DC bus 1511. It should be appreciated that the UPS 1500 may include more than four or less than four DC bus capacitors and that the DC bus capacitors may be configured in a different way.

According to one embodiment, the input section 1502 includes an input 1509 including a first input line 1503, a second input line 1505, a third input line 1508 and the neutral line 1510; a first switch 1512; a second switch 1514; a first thyristor 1516; a second thyristor 1518; a first plurality of diodes 1520; and a second plurality of diodes 1522. In one embodiment, the switches 1512, 1514 can be electro-magnetic switches such as relays or contacts; however, other types of switches may be used, for example, solid state switches. In one embodiment, either or both of the first switch 1512 and the second switch 1514 can include a multi-pole switch; however, other types of switches such as one or a plurality of single-pole switches may be used. In one embodiment, the thyristors 1516, 1518 can be Silicon Controlled Rectifiers (SCR); however, other types of thyristors may be used. In one embodiment, the diodes 1520, 1522 can be fast or ultra fast reverse recovery diodes; however, other types of diodes may be used. In accordance with one embodiment, the diodes 1520 and 1522 are configured in combination to provide a full wave rectifier.

In the illustrated embodiment, the input 1509 is configured to receive 3-phase power; however, it should be appreciated that the input 1509 be configured to receive other types of multi-phase power; and therefore, may include any number of phase conductors.

In the embodiment illustrated in FIG. 15, a first input line 1503 is coupled to the first switch 1512. The first input line 1503 is also selectively coupled to an anode of a first diode 1527 of the second plurality of diodes 1522 through the second switch 1514. A second input line 1505 is selectively coupled to an anode of a second diode 1529 of the second plurality of diodes 1522 through the second switch 1514. A third input line 1508 is selectively coupled to an anode of a third diode 1531 of the second plurality of diodes 1522 through the second switch 1514. The first input line 1503 is also selectively coupled to a cathode of a first diode 1521 of the first plurality of diodes 1520 through the second switch 1514. The second input line 1505 is also selectively coupled to a cathode of a second diode 1523 of the first plurality of diodes 1520 through the second switch 1514. The third input line 1508 is also selectively coupled to a cathode of a third diode 1525 of the first plurality of diodes 1520 through the second switch 1514. An anode of the first thyristor 1516 is coupled to the anode of the first diode 1521, the anode of the second diode 1523 and the anode of the third diode 1525 of the first plurality of diodes 1520. A cathode of the first thyristor 1516 is coupled to a negative terminal of the battery 1550. A cathode of the second thyristor 1518 is coupled to the cathode of the first diode 1527, the cathode of the second diode 1529 and the cathode of the third diode 1531 of the second plurality of diodes 1522. An anode of the second thyristor 1518 is coupled to a positive terminal of the battery 1550.

According to some embodiments, the first power converter 1504 includes a positive boost circuit which includes a first switch 1528, a first inductor 1524, a first diode 1534, and a third diode 1541, and a negative boost circuit which includes a second switch 1530, a second inductor 1526, a second diode 1536, and a fourth diode 1543. In one embodiment, the switches 1528 and 1530 can be Insulated Gate Bipolar Transistors (IGBTs); however, other types of switches may be used. In one embodiment, the diodes 1534, 1536, 1541, 1543 can be fast or ultra fast reverse recovery diodes; however, other types of diodes may be used. In the embodiment shown in FIG. 15, the first power converter 1504 includes two boost circuits: a positive boost circuit and a negative boost circuit; however, in other embodiments, the first power converter 1504 may include more than two or less than two boost circuits. For example, in one embodiment, the first power converter 1504 may include multiple positive boost circuits connected in parallel and multiple negative boost circuits connected in parallel.

In the illustrated embodiment, a first node 1539 of the first inductor 1524 is coupled to the cathode of the first diode 1527, the cathode of the second diode 1529 and the cathode of the third diode 1531 of the second plurality of diodes 1522 in the input section 1502. An anode of the first diode 1534 is coupled to a second node 1533 of the first inductor 1524 and a collector of the first switch 1528. A cathode of the first diode 1534 is coupled to the first DC bus 1507. The third diode 1541 is coupled between the collector of the first switch 1528 and an emitter of the first switch 1528. The emitter of the first switch 1528 is coupled to the second DC bus 1513. A first node 1551 of the second inductor 1526 is coupled to the anode of the first diode 1521, the anode of the second diode 1523 and the anode of the third diode 1525 of the first plurality of diodes 1520 in the input section 1502. A cathode of the second diode 1536 is coupled to a second node 1535 of the second inductor 1526 and an emitter of the second switch 1530. An anode of the second diode 1536 is coupled to the fourth DC bus 1511. The fourth diode 1543 is coupled between the emitter of the second switch 1530 and the collector of the second switch 1530. The collector of the second switch 1530 is coupled to the third DC bus 1515.

In accordance with the illustrated embodiment, the second power converter 1506 includes a first diode 1538, a second diode 1542, a third diode 1544, a fourth diode 1540, a fifth diode 1545, a sixth diode 1547, a first switch 1546, a second switch 1548, and an inductor 1532. In one embodiment, the switches 1546 and 1548 can be IGBTs; however, other types of switches may be used. In one embodiment, the diodes 1538, 1542, 1544, 1540, 1545, 1547 can be fast or ultra fast reverse recovery diodes; however, other types of diodes may be used.

In the embodiment illustrated in FIG. 15, a cathode of the first diode 1538 is coupled to the first DC bus 1507. An anode of the first diode 1538 is coupled to a collector of the first switch 1546. A cathode of the second diode 1542 is coupled to the anode of the first diode 1538 and the collector of the first switch 1546. A first node 1549 of the inductor 1532 is selectively coupled to the first input line 1503 of the input section 1502 through the first switch 1512 of the input section 1502. The anode of the second diode 1542 is coupled to a second node 1537 of the inductor 1532 and a cathode of the third diode 1544. The fifth diode 1545 is coupled between the collector of the first switch 1546 and an emitter of the first switch 1546. The emitter of the first switch 1546 is coupled to the neutral line 1510. A collector of the second switch 1548 is coupled to the neutral line 1510. An anode of the third diode 1544 is coupled to an emitter of the second switch 1548. The sixth diode 1547 is coupled between the collector of the second switch 1548 and the emitter of the second switch 1548. The emitter of the second switch 1548 is coupled to a cathode of the fourth diode 1540. An anode of the fourth diode 1540 is coupled to the fourth DC bus 1511

In accordance with the illustrated embodiment, the battery charger/boost circuit 1553 includes a first inductor 1552, a second inductor 1554, a first switch 1556, a second switch 1558, a third switch 1560, a fourth switch 1562, a first diode 1564, a second diode 1566, a third diode 1568, and a fourth diode 1570. In one embodiment, the switches 1556, 1558, 1560, 1562 can be IGBTs; however, other types of switches may be used. In one embodiment, the diodes 1564, 1566, 1568, 1570 can be fast or ultra fast reverse recovery diodes; however, other types of diodes may be used.

In the embodiment illustrated in FIG. 15, a first node 1559 of the first inductor 1552 is coupled to the positive terminal of the battery 1550. A collector of the first switch 1556 is coupled to the first DC bus 1507. An emitter of the first switch 1556 is coupled to a second node 1555 of the first inductor 1552 and a collector of the second switch 1558. The first diode 1564 is coupled between the collector of the first switch 1556 and the emitter of the first switch. An emitter of the second switch 1558 is coupled to the second DC bus 1513. A second diode 1566 is coupled between the collector of the second switch 1558 and the emitter of the second switch 1558. A first node 1601 of the second inductor 1554 is coupled to the negative terminal of the battery 1550. A collector of the third switch 1560 is coupled to the third DC bus 1515. An emitter of the third switch 1560 is coupled to a second node 1557 of the second inductor 1554 and a collector of the fourth switch 1562. The third diode 1568 is coupled between the collector of the third switch 1560 and the emitter of the third switch. An emitter of the fourth switch 1562 is coupled to the fourth DC bus 1511. A fourth diode 1570 is coupled between the collector of the fourth switch 1562 and the emitter of the fourth switch 1562.

In accordance with one embodiment, the bus balancer 1571 includes a first switch 1572, a second switch 1574, a third switch 1576, a fourth switch 1578, a fifth switch 1580, a sixth switch 1582, a first diode 1584, a second diode 1586, a third diode 1588, a fourth diode 1590, a fifth diode 1592, a sixth diode 1594, a first inductor 1596, a second inductor 1602, a third inductor 1604, a first capacitor 1598, and a second capacitor 1600. In one embodiment, the switches 1556, 1558, 1560, 1562 can be IGBTs; however, other types of switches may be used. In one embodiment, the diodes 1584, 1586, 1588, 1590, 1592, 1594 can be fast or ultra fast reverse recovery diodes; however, other types of diodes may be used.

According to the embodiment illustrated in FIG. 15, a collector of the first switch 1572 is coupled to the first DC bus 1507. A first diode 1584 is coupled between the collector of the first switch 1572 and an emitter of the first switch 1572. The emitter of the first switch 1572 is coupled to a collector of the second switch 1574 and a second node 1605 of the first inductor 1596. The second diode 1586 is coupled between the collector of the second switch 1574 and an emitter of the second switch 1574. The emitter of the second switch 1574 is coupled to the second DC bus 1513. A collector of the third switch 1576 is coupled to the second DC bus 1513. A third diode 1588 is coupled between the collector of the third switch 1576 and an emitter of the third switch 1576. A first node 1609 of the third inductor 1604 is coupled to the emitter of the third switch 1576. A collector of the fourth switch 1578 is coupled to the emitter of the third switch 1576 and the first node 1609 of the third inductor 1604. A fourth diode 1590 is coupled between the collector of the fourth switch 1578 and an emitter of the fourth switch 1578. The emitter of the fourth switch 1578 is coupled to the third DC bus 1515. A collector of the fifth switch 1580 is coupled to the third DC bus 1515. A fifth diode 1592 is coupled between the collector of the fifth switch 1580 and an emitter of the fifth switch 1580. The emitter of the fifth switch 1580 is coupled to a first node 1597 of the second inductor 1602 and a collector of the sixth switch 1582. The sixth diode is coupled between the collector of the sixth switch 1582 and an emitter of the sixth switch 1582. The emitter of the sixth switch 1582 is coupled to the fourth DC bus 1511. A first node 1595 of the first inductor 1596 is coupled to the first capacitor 1598. The first capacitor 1598 is coupled to the first node 1609 of the third inductor 1604, the emitter of the third switch 1576 and the second capacitor 1600. The second capacitor 1600 is coupled to a second node 1607 of the second inductor 1602. A second node 1603 of the third inductor 1604 is coupled to the neutral line 1510.

According to one embodiment, the DC/AC converter 1613 includes a first switch 1614, a second switch 1616, a third switch 1618, a fourth switch 1620, a fifth switch 1622, a sixth switch 1624, a first diode 1626, a second diode 1628, a third diode 1630, a fourth diode 1632, a fifth diode 1634, a sixth diode 1636, an inductor 1638, a capacitor 1640 and an output 1642. In one embodiment, the switches 1614, 1616, 1618, 1620, 1622, 1624 can be IGBTs; however, other types of switches may be used. In one embodiment, the diodes 1626, 1628, 1630, 1632, 1634, 1636 can be fast or ultra fast reverse recovery diodes; however, other types of diodes may be used. According to some embodiments, the UPS includes a plurality of DC/AC converters each coupled to the first DC bus 1507, the second DC bus 1513, the third DC bus 1515 and the fourth DC bus 1511. For clarity, FIG. 15 illustrates the DC/AC converter 1613 as a single phase converter having a single phase output 1642. However, it should be appreciated, that in some embodiments, the DC/AC converter 1613 can be configured such that the converter 1613 provides a multiphase AC output at the output 1642. According to some embodiments, the UPS 1500 includes a plurality of converters 1613 where, for example, each converter 1613 receives power from the DC buses 1507, 1511, 1513 and 1515 and each converter provides an output for a different phase of a multiphase output provided at the output 1642. For example, in one embodiment, the output 1642 is a three phase, 4 wire output where a separate converter 1613 is employed to supply power to one of the three phases, respectively. According to some embodiments, the converter 1613 is configured to operate as an inverter.

A collector of the first switch 1614 is coupled to the first DC bus 1507. The first diode 1626 is coupled between the collector of the first switch 1614 and an emitter of the first switch 1614. A collector of the second switch 1616 is coupled to the emitter of the first switch 1614. The second diode 1628 is coupled between the collector of the second switch 1616 and an emitter of the second switch 1616. The emitter of the second switch 1616 is coupled to the second DC bus 1513. A collector of the third switch 1618 is coupled to the third DC bus 1515. The third diode 1630 is coupled between the collector of the third switch 1618 and an emitter of the third switch 1618. A collector of the fourth switch 1620 is coupled to the emitter of the third switch 1618. The fourth diode 1632 is coupled between the collector of the fourth switch 1620 and an emitter of the fourth switch 1620. The emitter of the fourth switch 1620 is coupled to the fourth DC bus 1511. A collector of the fifth switch 1622 is coupled to the emitter of the first switch 1614 and the collector of the second switch 1616. The fifth diode 1634 is coupled between the collector of the fifth switch 1622 and an emitter of the fifth switch 1622. A collector of the sixth switch 1624 is coupled to the emitter of the fifth switch 1622. The sixth diode 1636 is coupled between the collector of the sixth switch 1624 and an emitter of the sixth switch 1624. The emitter of the sixth switch 1624 is coupled to the emitter of the third switch 1618 and the collector of the fourth switch 1620. A first node 1639 of the inductor 1638 is coupled to the emitter of the fifth switch 1622 and the collector of the sixth switch 1624. A second node 1637 of the inductor 1638 is coupled to the output 1642. The capacitor 1640 is coupled between the output 1642 and the neutral line 1510.

In one embodiment, some sections 1504, 1506, 1553, 1571, 1613 of the UPS 1500 can also include controllers 1650, 1652, 1654, 1656, 1658. In some embodiments, one or more of the controllers can implement a desired control loop to achieve a selected operation of the associated section of the UPS 1500. The duty cycles of switches within the different sections 1504, 1506, 1553, 1571, 1613 of the UPS 1500 may be independently operated by the controllers 1650, 1652, 1654, 1656, 1658. In one embodiment, the controllers 1650, 1652, 1654, 1656, 1658 may include PWM control. In another embodiment, the controllers are digital controllers; however, the controllers may also be implemented by analog circuitry. In another embodiment, each controller 1650, 1652, 1654, 1656, 1658 includes individually controlled set-points which may be used to configure the controller. In some embodiments, a master controller controls operation of a plurality of the sections of the UPS and two or more of the controllers 1650, 1652, 1654, 1656, 1658 are included in the master controller.

By adjusting the switching pattern of a switch, a controller 1650, 1652, 1654, 1656, 1658 controls the actual current in the switches' associated inductor to accurately follow a reference waveform and minimize the difference between the reference waveform and the actual current waveform. According to some embodiments, the controller can provide any of "P" (Proportional) type control, "P-I" (Proportional-Integral) type control, or "P-I-D" (Proportional-Integral-Differential) type control. Generation of the reference waveforms is discussed in greater detail below.

In one embodiment, a controller 1650, 1652, 1654, 1656, 1658 controls operation of one or more switches included in one of the first power converter 1504, the second power converter 1506, the battery charger/boost circuit 1553, the bus balancer 1571 and the DC/AC converter 1613. A control loop operates to measure the current through the associated switch(es) and subtracts the measured current signal from a reference waveform. In response to the measured difference (error signal), the control loop operates to adjust the switching pattern of the switch to minimize the error signal. For example, the resulting error signal is provided to the controller, in one embodiment, a PWM controller. In one embodiment, the error signal is amplified by a regulator before being supplied to the controller. The operation of the controller may be dependent on the type of control being used (e.g. Proportional, Proportional-Integral, or Proportional-Integral-Differential).

In one embodiment, a PWM controller is implemented by a comparator with the error signal provided to the PWM controller's non-inverting input and a triangular (or saw tooth shaped) carrier signal provided to the PWM controller's inverting input. The frequency of the carrier signal determines the switching frequency of the PWM controller's associated switch. However, it should be appreciated that the PWM controllers may be configured differently. In one embodiment, the PWM controller is implemented by analog components; however, any of the PWM controllers can also be implemented digitally, for example, by a DSP, FPGA or microprocessor.

Some embodiments of the UPS 1500 illustrated in FIG. 15 are capable of operating in multiple modes of operation including a "normal" mode and a "battery" mode. According to one embodiment, the operating mode is determined based whether adequate AC power is provided to the input 1509 to sufficiently power a load (not shown) coupled to the output 1642 of the UPS. Where adequate AC power is being provided to the input 1509 to sufficiently power the load, the UPS 1500 can operate in the normal mode. Where inadequate AC power is being provided to the input 1509 to sufficiently power the load, the UPS 1500 can operated in the battery mode.

The operation of the UPS 1500 in normal mode is now described with reference to FIG. 15 in accordance with one embodiment. The input 1509 of the input section 1502 receives input AC power, including an AC voltage, from an external AC source (not shown). In one embodiment, the input power provided to the input 1509 is 3-phase power and each input line 1503, 1505, 1508 of the input 1509 is connected to one phase of the 3-phase power source. The three phase power is provided by the input lines 1503, 1505, 1508 to corresponding diodes 1520, 1522 of a rectifier, through the second switch 1514 when closed. The first plurality of diodes 1520 receives the 3-phase power from the input 1509 and provides the negative half-cycles of the 3-phase power to the first power converter 1504. The second plurality of diodes 1522 receives the 3-phase power from the input 1509 and provides the positive half-cycles of the 3-phase power to the first power converter 1504. In one embodiment, the power provided to the first power converter 1504 by the first plurality of diodes 1520 and the second plurality of diodes 1522 is drawn from the phase of the 3-phase power having the largest negative or positive instantaneous voltage of the three phases, respectively.

In the normal mode of operation, the first power converter 1504 draws power from the rectifier diodes 1522, 1520 and provides DC power to the DC buses 1507, 1513, 1515, 1511. The positive boost circuit of the first power converter 1504 provides DC power to the first DC bus 1507 and the second DC bus 1513. The duty cycle of the first switch 1528 of the positive boost circuit is operated to control the current level and waveform of the electrical signal in the first inductor 1524. For example, if the duty cycle of the first switch 1528 approaches 100%, the first switch 1528 is always on and the voltage at the second node 1533 of the first inductor 1524 is close to the voltage level of the second DC bus 1513. If the duty cycle of the first switch 1528 approaches 0%, the first switch 1528 is always off and the voltage at the second node 1533 of the first inductor 1524 is close to the voltage level of the first DC bus 1507.

According to one embodiment, the positive boost circuit illustrated in FIG. 15 is configured to operate with the magnitude of the positive portion of the incoming AC voltage level at the input 1509 having a value somewhere between the magnitude of the first positive DC voltage of the first DC bus 1507 and the magnitude of the second positive DC voltage of the second DC bus 1513. As discussed above, in one embodiment, the duty cycle of the first switch 1528 is operated by a controller 1650. In an additional embodiment, the controller 1650 includes a Pulse-Width Modulation (PWM) controller, however, other forms of control may be employed.

The negative boost circuit of the first power converter 1504 provides DC power to the third DC bus 1515 and the fourth DC bus 1511. The duty cycle of the second switch 1530 of the negative boost circuit is operated to control the current level and waveform of the electrical signal in the second inductor 1526. For example, if the duty cycle of the second switch 1530 approaches 100%, the second switch 1530 is always on and the voltage at the second node 1535 of the second inductor 1526 is close to the voltage level of the third DC bus 1515. If the duty cycle of the second switch 1530 approaches 0%, the second switch 1530 is always off and the voltage at the second node 1535 of the second inductor 1526 is close to the voltage level of the fourth DC bus 1511. According to one embodiment, the negative boost circuit illustrated in FIG. 15 is configured to operate with the magnitude of the negative portion of the incoming AC voltage level at the input 1509 having a value somewhere between the magnitude of the first negative DC voltage of the fourth DC bus 1511 and the magnitude of the second negative DC voltage of the third DC bus 1515. In one embodiment, the duty cycle of the second switch 1530 is operated by a controller 1650. In an additional embodiment, the controller 1650 provides a Pulse-Width Modulation (PWM) control, however, other forms of control may be employed.

In accordance with one embodiment, the voltage provided to the first power converter 1504 follows the sinusoidal waveform of the incoming phase-to-neutral voltages at the input 1509 when the first power converter 1504 draws power from the input 1509. According to one embodiment, due to the diode configuration of the first power converter 1504, the first power converter 1504 only draws power from the input 1509 during 120 degree phase intervals of each half cycle. As a result, the first power converter 1504 does not draw power from the input 1509 during the phase intervals of plus 30 degrees to minus 30 degrees around each zero crossing of the input voltage. According to this embodiment, because the positive boost circuit only operates to draw power during the interval from 30 to 150 degrees of the phase-to-neutral positive voltage at the input 1509, the magnitude of the voltage received by the positive boost circuit will only vary for a range of voltages with a magnitude of 50% to 100% of the peak phase-to-neutral voltage. Also according to this embodiment, because the negative boost circuit only operates to draw power during the interval from 30 to 150 degrees of the phase-to-neutral negative voltage at the input 1509, the magnitude of the voltage received by the negative boost circuit will only vary for a range of voltages with a magnitude of 50% to 100% of the peak phase-to-neutral voltage.

As a result of the preceding limitation on the range of voltages seen by the first power converter, the first power converter 1504 does not operate with voltages approaching zero. Thus, according to this embodiment, the first switch 1528 and second switch 1530 need not be connected to the neutral line 1510, and are instead connected to the second bus 1513 and third bus 1515, respectively. The preceding approach can be employed because the absolute voltage levels of the second bus 1513 and the third bus 1515 are each less than 50% of the peak phase-to-neutral voltage at the input 1509.

It is to be appreciated that the connection of the first switch 1528 and the second switch 1530 to the DC buses 1513, 1515, respectively, reduces the magnitude of a difference between the maximum and minimum voltages that appear across the switch, for example, when transitioning from an on-state to an off-state. According to one embodiment where the voltage difference between the first DC bus 1507 and the second DC bus 1513 is two thirds of the voltage of first DC bus 1507 to neutral, the switching losses for the first power converter 1504 are reduced 33% compared to a design in which the switches of a boost circuit are connected to the neutral line 1510. According to one embodiment, the inductance of the inductors 1524, 1526 may also be reduced as a result of the preceding approach because the inductors are also subjected to a narrower range of voltages. For example, if the switching losses were reduced by 33%, the inductors 1524, 1526 could also be reduced by 33%. The reduction in inductance may also result in reduced resistance due to reduced quantity of windings in the inductors.

According to some embodiments, the UPS 1500 includes the second power converter 1506 to draw power during the phase interval about the zero crossings of the voltage received at the input 1509, for example, from approximately plus 30 degrees to approximately minus 30 degrees around each zero crossing. In the illustrated embodiment, the second power converter 1506 draws AC power from the input 1509 and provides DC power to the first DC bus 1507 and the fourth DC bus 1511. For clarity, FIG. 15 illustrates a single second power converter 1506 which is coupled to a single phase of the input 1509. However, in practice, some embodiments employ a separate second power converter 1506 for each of the phases which is provided at the input, respectively. Thus, according to the illustrated embodiment which includes three phases, a separate switch 1512 is coupled to each of the first input line 1503, the second input line 1505 and the third input line 1508, respectively, where the switch couples the respective input line to a second power converter that only receives power from the corresponding input line.

In the illustrated embodiment, the inductor 1532 and first switch 1546 act as a positive boost circuit and the inductor 1532 and second switch 1548 act as a negative boost circuit.

According to this embodiment, the duty cycles of the first switch 1546 and the second switch 1548 are controlled to draw positive and negative voltage respectively from the input 1509 during phase intervals of +/−30 degrees around each zero crossing of the voltage at the input 1509 to compensate for periods of the input waveform during which the first power converter 1504 is not drawing power. In one embodiment, the duty cycles of the first switch 1546 and the second switch 1548 are operated by a controller 1652. In an additional embodiment, the controller 1652 provides a Pulse-Width Modulation (PWM) control. Operation of the duty cycles of the first switch 1546 and the second switch 1548 will be discussed in greater detail below. Through the operation of the first power converter 1504 and the second power converter 1506, the DC buses 1507, 1513, 1515, 1511 receive DC power over 180 degree phase intervals of each half cycle of the voltage at the input 1509 during normal operation of the UPS 1500. Further, according to this embodiment, the UPS 1500 provides a substantially sinusoidal current draw from the input power source.

According to some embodiments, the battery charger/boost circuit 1553 operates to receive DC power from the DC buses 1507, 1513, 1515, 1511 and provide DC power to the battery 1550 as necessary to charge the battery 1550 when the UPS 1500 is receiving sufficient power at the input 1509 to meet the power requirement of the connected load. In the illustrated embodiment, the battery charger/boost circuit 1553 is operated as a buck converter to step down the voltage from the DC buses 1507, 1511 to provide the power required to charge the battery 1550. When the battery is being charged, the first switch 1556 and the fourth switch 1562 are controlled to operate as a buck circuit with the inductors 1552 and 1554, respectively, and the second switch 1558 and the third switch 1560 are switched off.

It also is to be appreciated that the benefits of reduced size and reduced losses discussed above in relation to the first power converter 1504 and its connection to the second DC bus 1513 and third DC bus 1515 instead of the neutral line 1510, can also apply to the battery charger/boost circuit 1553. This is possible because the voltage level at the positive terminal of the battery 1550 falls within the voltage range between the first and second DC bus 1507, 1513 and the voltage level at the negative terminal of the battery 1550 falls within the voltage range between the third and fourth DC bus 1515, 1511. Thus, according to this embodiment, the first switch 1556 and fourth switch 1562 need not be connected to the neutral line 1510, and are instead connected to the second bus 1513 through the second diode 1566 and third bus 1515 through the third diode 1568, respectively.

It is to be appreciated that the connection of the first switch 1556 and the fourth switch 1562 to the DC buses 1513, 1515, respectively, reduces the magnitude of a difference between the maximum and minimum voltages that appear across the switch, for example, when transitioning from an on-state to an off-state. According to one embodiment where the voltage difference between the first DC bus 1507 and the second DC bus 1513 is two thirds of the voltage of first DC bus 1507 to neutral, the switching losses for the battery charger/boost circuit 1553 are reduced 33% compared to a design in which the switches are connected to the neutral line 1510. It is also to be appreciated that the inductance of the inductors 1552, 1554 may also be reduced as a result of the preceding approach because the inductors are also subjected to a narrower range of voltages. For example, if the switching losses were reduced by 33%, the inductors 1552, 1554 could also be reduced by 33%. The reduction in inductance may also result in reduced resistance due to reduced windings in the inductors.

In some embodiments, the bus balancer 1571 is configured to balance and maintain desired voltages on the DC buses 1507, 1513, 1515, 1511 by moving energy stored in the capacitors 1606, 1608, 1610, 1612 onto the buses 1507, 1513, 1515, 1511 as needed. According to some embodiments, the operation of the bus balancer 1571 is substantially the same as the bus balancer 1200 described in relation to FIG. 12 above. Accordingly, the operation of the bus balancer 1571 is summarized here.

In general, according to one embodiment, the bus balancer 1571 illustrated in FIG. 15 operates such that the voltage difference across the first resonant tank (including first inductor 1596 and first capacitor 1598) and the second resonant tank (including second inductor 1602 and second capacitor 1600) are preferably equal to approximately one-third of the total DC voltage between the bus 1507 and the bus 1511. Also, during balanced operation of the DC bus balancer 1571 (e.g., the voltages on the DC buses 1507, 1513, 1515, 1511 are at desired levels), the signals present at nodes 1605, 1609 and 1597 are substantially square. During balanced operation, the voltage swings at nodes 1605, 1609 and 1597 will be substantially in phase with each other and have substantially the same amplitude. The voltage difference across the first resonant tank (including first inductor 1596 and first capacitor 1598) and the second resonant tank (including second inductor 1602 and second capacitor 1600) are preferably about equal to one-third of the total DC voltage between the bus 1507 and the bus 1511. The capacitors 1598 and 1600 are configured to charge to the potential placed across the resonant tanks.

According to one embodiment, the DC bus balancer 1571 compensates for unbalanced voltages on the DC buses 1507, 1513, 1515, 1511 using energy stored in the first resonant tank (including first inductor 1596 and first capacitor 1598) and the second resonant tank (including second inductor 1602 and second capacitor 1600).

The DC/AC converter 1613 operates as a DC/AC converter and is configured to receive DC power from the DC buses 1507, 1513, 1515, 1511 and provide an AC output to the output 1642. The operation of the DC/AC converter 1613 is substantially the same as the DC/AC converter 700 described in relation to FIG. 7 above. Accordingly, the operation of the DC/AC converter 1613 is summarized here.

According to the illustrated embodiment, the DC/AC converter 1613 receives DC power from the first power converter 1504, or the battery 1550 via the buses 1507, 1511, 1513, 1515. The DC/AC converter 1613 converts the DC power to AC power by switching the switches 1614, 1616, 1618, 1620, 1622, 1624 in a predetermined sequence. The sequence in which the switches 1614, 1616, 1618, 1620, 1622, 1624 are operated depends on the desired output at the output 1642. In general, the duty cycle of the switches 1614, 1616, 1618, 1620, 1622, 1624 that are being actively switched are varied such that the voltage at the output 1642 is substantially AC. The DC/AC converter 1613 generates an AC output having peak voltages about equal to the voltages present on the DC buses 1507 and 1511.

In one embodiment, the nominal voltages present on the DC buses 1507 and 1511 are regulated to be slightly greater than the peak amplitude of the incoming voltage at the input 1509. This can be done to buffer the DC/AC converter 1613 from distortion at the input 1509 resulting from, for example, voltage spikes or abnormally high input voltages. As a result the peak voltage of the AC output generated by the DC/AC converter 1613 may be slightly less than the voltages present on the DC buses 1507 and 1511. The preceding approach can also allow the UPS 1500 to supply power at a nominal output voltage even where the incoming voltage is abnormally high. It is to be appreciated that the configuration of the power that is provided to the load can vary depending on the desired operation. For example, the DC/AC converter 1613 can provide one phase of a 3-phase power connection or power having a single phase. In one embodiment, the duty cycles of switches 1614, 1616, 1618, 1620, 1622, 1624 are operated by a controller 1658. According to one embodiment, the controller 1658 provides a Pulse-Width Modulation (PWM) control.

According to some embodiments, where AC power provided to the input 1509 is not sufficient to meet the demand of the load connected to the output 1642, power from the battery 1550 can be used to meet the demand of the connected load. According to one embodiment, the power provided by the battery 1550 can be used either alone or in combination with power supplied to the input.

Operation of the UPS 1500 in battery mode is described here with reference to the embodiment illustrated in FIG. 15. In one embodiment of the battery mode of operation, AC power provided at the input 1509 is insufficient to power the load and as a result the UPS 1500 provides power to the output 1642 from the battery 1550. In this embodiment, the first power converter 1504 and the second power converter 1506 are disconnected from the input 1509 by the switches 1514 and 1512, respectively. In some embodiments, an electromechanical device such as a relay or contactor 1512, 1514 is used to disconnect the input 1509 from the first and second power converters 1504, 1506. According to other embodiments, either or both of the switches 1512 and 1514 include solid state switches.

According to one embodiment, with the input 1509 disconnected from the first and second power converters 1504, 1506, the battery 1550 can be connected to the input of the first power converter 1504. In one embodiment, thyristors 1516, 1518 are operated in an on-state to connect the first power converter 1504 to the battery 1550. According to one embodiment, when operating on battery power, a first portion of the total DC power fed to the DC buses 1507, 1513, 1515, 1511 is provided from the battery 1500 via the first power converter 1504 while a second portion of the total DC power fed to the DC buses 1507, 1513, 1515, 1511 is directly provided by the battery charger/boost circuit 1553.

In some embodiments, the first power converter 1504 operates as a battery voltage boost circuit when the UPS 1500 is providing power to the output 1642 from the battery 1550. The first power converter 1504 receives DC power from the battery 1550 via the thyristors 1518, 1516 which are turned on when the UPS is operating under battery power. The positive boost circuit of the first power converter 1504 is controlled to operate as a boost circuit and provide DC power from the battery 1550 to the first DC bus 1507 and the second DC bus 1513. The negative boost circuit of the first power converter 1504 is controlled to operate as a boost circuit and provide DC power from the battery 1550 to the third DC bus 1515 and the fourth DC bus 1511. According to the preceding, the first power converter 1504 provides a first portion of the total power supplied to the DC buses 1507, 1513, 1515, 1511.

According to a further embodiment, while operating under battery power, the battery charger/boost circuit 1553 operates as a boost converter to step up the voltage received from the battery 1550 and provide a second portion of the total power supplied to the DC buses 1507, 1513, 1515, 1511. In one embodiment, the second switch 1558 operates in a boost circuit including the inductor 1552 to supply power from the battery 1550 to the DC bus 1513. According to this embodiment, the third switch 1560 operates in a boost circuit including the inductor 1554 to supply power from the battery 1550 to the DC bus 1515. Also according to this embodiment, the first switch 1556 and the fourth switch 1562 are switched off during the battery mode of operation and power from the battery is supplied to each of the DC bus 1507 and the DC bus 1511 via diodes 1564 and 1570, respectively. As discussed above, in one embodiment, the duty cycles of the switches 1556, 1558, 1560, 1562, 1528 are operated by a controller 1654. In an additional embodiment, the controller 1654 provides a Pulse-Width Modulation (PWM) control.

According to some embodiments, the first power converter 1504 provides greater than 50% of the total power supplied by the DC buses 1507, 1513, 1515, 1511, and the battery charger/boost circuit 1553 provides the remainder of the total power supplied by the DC buses 1507, 1513, 1515, 1511 (for example, 49%). In one embodiment, the first power converter 1504 provides 70% of the total power supplied by the DC buses 1507, 1513, 1515, 1511, and the battery charger/boost circuit 1553 provides the remaining 30%. However, it is to be appreciated that the ratio of the amount of power provided to the DC bus (and consequently the load) by the first power converter 1504 and relative to the amount of power provided to the DC buses by the battery charger/boost circuit 1553 can differ from the preceding examples. Accordingly, in one embodiment, the battery charger/boost circuit 1553 provides greater than 50% of the total power supplied by the DC buses 1507, 1513, 1515, 1511, and the first power converter 1504 provides the remainder of the total power supplied by the DC buses 1507, 1513, 1515, 1511.

It is to be appreciated that by limiting the percentage of total power required to be supplied to the DC buses 1507, 1513, 1515, 1511 by the battery charger/boost circuit 1553, the battery charger/boost circuit 1553 may be designed for a continuous power rating that is less than the total power provided by the UPS 1500 at the output 1642. For example, the continuous power rating of the battery charger/boost circuit 1553 can be substantially less than 100% of power the UPS 1500 is rated to provide. For example, if the battery charger/boost circuit 1553 is configured to provide 30% of the total power to the DC buses 1507, 1513, 1515, 1511, then the battery charger/boost circuit 1553 may be designed with a power rating equal to 30% of the rated total power of the UPS 1500.

According to further embodiments, the UPS 1500 is configured to operate in a transition state to return to normal operation following an operation on battery power, for example, when AC power is available at the input 1509. According to one embodiment, the transition state includes two intervals. During the first interval, power drawn from the battery 1550 by the first power converter 1504 is reduced while power drawn from the battery 1550 by the battery charger/boost circuit 1553 is increased. During the second interval, power drawn from the input 1509 by the first and second power converters 1504 is increased while power drawn from the battery 1550 is reduced. In one embodiment, each interval occupies five seconds with the total transition occurring in ten seconds. However, the length of the intervals can vary from one another and may occupy a longer or shorter amount of time. According to a further embodiment, the first interval and the second interval overlap for at least a portion of each interval. According to still another embodiment, the first interval and the second interval occur substantially simultaneously.

In one embodiment, the UPS 1500 begins the first interval to transition back to normal mode from battery mode when the AC power at the input 1509 is detected to be stable and within adequate voltage and frequency limits. During the first interval, the first switch 1512 is closed and AC power is drawn from the input 1509 by the second power converter 1506. According to this embodiment, the second switch 1514 remains open during the first interval. As described above, in the normal mode of operation the second power converter 1506 only draws power in intervals around the zero crossings of the in put waveform. However, during the first interval of transition back to AC power, the second power converter 1506 is controlled to draw sinusoidal current waveforms over the entire line cycle. Further, in one embodiment, the AC power drawn from the input 1509 is linearly increased during the first interval from zero to a level which covers approximately 50% of the total power supplied to the DC buses (that is, 50% of the power provided to the output 1642). While the AC power drawn by the second power converter 1506 is increased during the first interval, the power drawn from the battery 1550 is reduced.

In addition, the ratio of battery power provided to the DC bus via the first power converter relative to battery power provided to the DC bus via the battery charger/boost circuit 1553 is reduced during the first interval. As a result, at the end of the first interval (for example, after 5 seconds), 50% of the power supplied to the DC buses 1507, 1513, 1515, 1511 is drawn from the input 1509 via the second power converter

1506 and the remaining 50% is drawn from the battery 1550 via the battery charger/boost circuit 1553. During the first interval, the current drawn by the first power converter 1504 may be reduced to zero.

During the second interval, the thyristors 1518, 1516 are turned off to isolate the batteries from the first power converter 1504 and the second switch 1514 is closed to allow the first power converter 1504 to draw AC power from the input 1509. In addition, the amplitude and waveform of the AC power drawn from the input 1509 by the first power converter 1504 and the second power converter 1506 is adjusted. The amount of total power provided from the AC input is increased and the DC current drawn from the battery 1550 via the battery charger/boost circuit 1553 is reduced. As a result, at the end of the second interval (for example, after another 5 seconds), the UPS 1500 is in the steady-state "normal mode" of operation, where all required power is drawn from the input 1509 by the first power converter 1504 and the second power converter 1506 in the manner previously described. It is to be appreciated that during the above described transition state, the battery charger/boost circuit 1553 and the second power converter 1506 may each supply 50% of the total power provided at the UPS output 1642. However, according to some embodiments, due to the short duration of the transition from battery to normal operation, the battery charger/boost circuit 1553 and the second power converter 1506 can be designed with a maximum continuous rating of less than 50% of the maximum rated output of the UPS and still reliably operate through the transition.

Accordingly, in one embodiment, the battery charger/boost circuit 1553 can be designed for a continuous power rating equal to a value less than 50% of the total required power. For example, in one embodiment, the battery charger/boost circuit 1553 has a continuous power rating equal to 30-40% of the maximum rated power output of the UPS. In addition, the second power converter 1506 can be designed to handle the rms-current derived from the required current during the short phase intervals around the zero crossings at full power.

It is also to be appreciated that the continuous power rating of the battery charger/boost circuit 1553 may be designed for a continuous power rating that is 100% of the power the UPS 1500 is rated to provide. In accordance with this embodiment, with the battery charger/booster circuit 1553 has a rating equal to the full rating of the UPS 1500. According to this embodiment, all of the power supplied by the battery 1550 can by provided to the DC buses 1507, 1511, 1513, 1515 via the battery charger/booster circuit 1553. Further, it is unnecessary to supply power from the battery 1550 to the DC buses 1507, 1511, 1513, 1515 via the first power converter 1504 according to this embodiment. Accordingly, in some embodiments, the first thyristor 1516 and the second thyristor 1518 are not included in the UPS, that is, the battery is not connected to the input of the first power converter 1504.

The preceding approach can also allow for operation of the UPS in the transition from battery operation to normal operation in a more simplified manner. For example, a single transition state can be employed in which power drawn from the input 1509 by the first and second power converters 1504 is increased while power drawn from the battery 1550 by the battery charger/booster circuit 1553 is reduced. As a result, at the end of the transition interval, the UPS 1500 is in the steady-state "normal mode" of operation, where all required power is drawn from the input 1509 by the first power converter 1504 and the second power converter 1506 in the manner previously described. According to one embodiment, the transition interval occupies ten seconds; however, the length of the interval can vary and may occupy a longer or shorter amount of time in various embodiments.

According to a further embodiment, the UPS can also include an "overload" mode of operation in which power is provided to the DC buses from each of the batteries 1550 and input 1509, together for at least some level of overload. According to one embodiment, an overload operation occurs when the power required at the output 1642 is greater than the rated power of the UPS 1500. For example, in one embodiment where a load requires 150% of the rated power of the UPS 1500, it may be desired to limit the AC current at the input 1509 to 130% of the rated power of the UPS 1500 to avoid tripping an upstream circuit breaker. As such, the remaining 20% could be provided by the battery 1550 via the battery charger/boost circuit 1553. According to this embodiment, the UPS 1500 can be configured to provide a first portion of the total required power from the battery 1550 and a second portion of the total required power from the input 1509. As mentioned above, by providing power to the output 1642 from both the battery 1550 and the input 1509, it may be possible to limit the AC current drawn from the external AC source at the input 1509 and avoid tripping an upstream circuit protection device such as a circuit breaker or a fuse. In one embodiment, the preceding approach establishes the rating based on ampacity rather than power. In this embodiment, the above limits may be impacted by changes in the magnitude of the input voltage. For example, if the line voltage is abnormally low, for example 85% of nominal, then the power supplied from the AC input can be limited to 0.85 (130%) or 110.5% while the remaining power 39.5% will be provided from the battery 1550 to maintain the current within the desired ampacity limits.

As mentioned above, the UPS 1500 can include control systems that generate reference waveforms to control the operation of switches in different sections of the UPS 1500. The reference waveforms may vary depending on whether the UPS 1500 is supplying power to the output solely with power received at the input 1509, solely with power provided by the battery 1550 or is in a transition state from battery power to AC input power.

In general, the controllers operate the switches to follow the different reference waveforms depending on the mode of the UPS 1500 and the individual switch being controlled. As discussed above in relation to the embodiment of FIG. 15, during normal operation of the UPS 1500, the first power converter 1504 and the second power converter 1506 perform load sharing. The first power converter 1504 draws power from the input 1509 in intervals of 120 degrees out of each half cycle and the second power converter 1506 draws power from the input 1509 in intervals of +/−30 degrees around each zero crossing.

Figure 16:
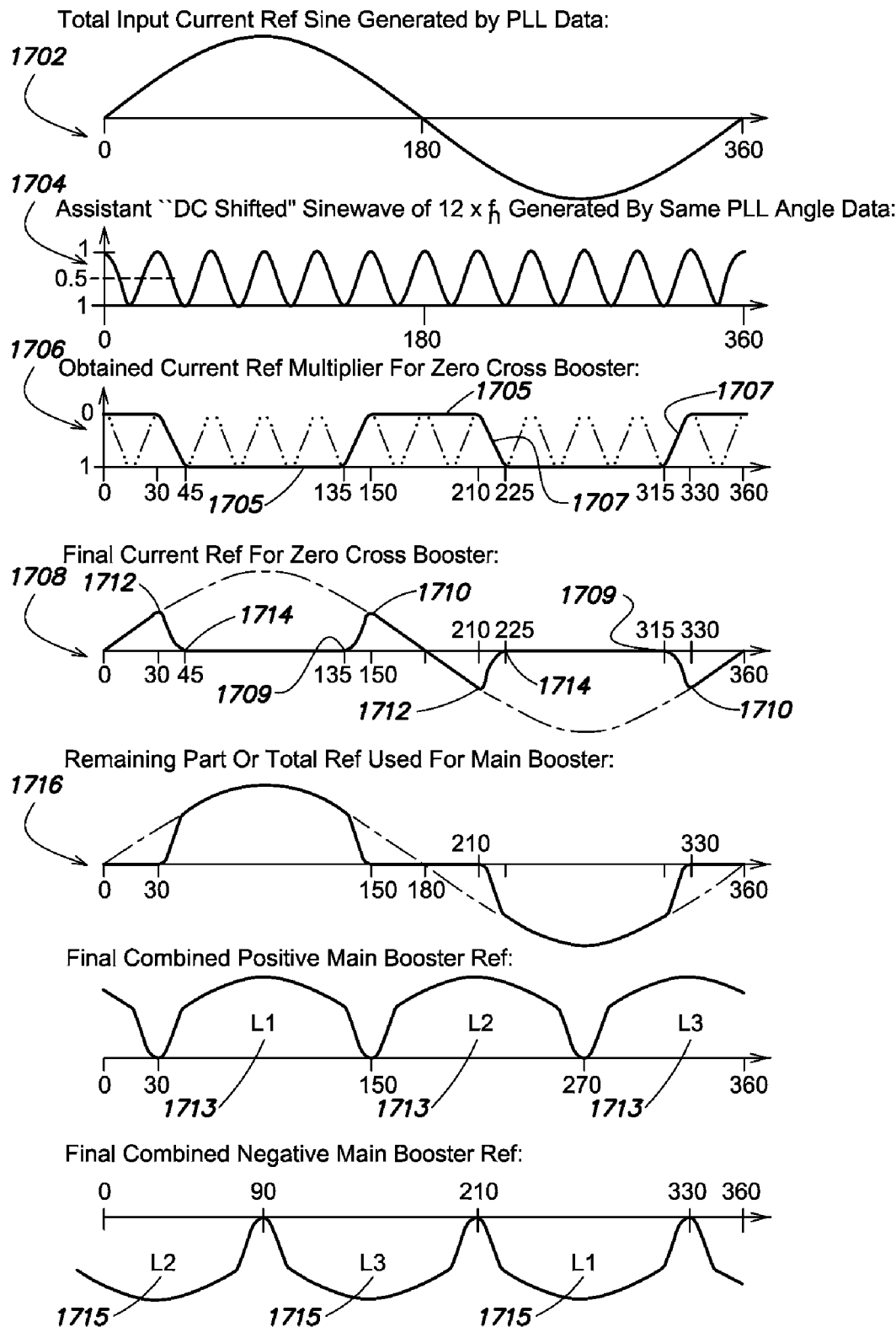
FIG. 16 illustrates waveform-plots of load sharing for an embodiment of the UPS illustrated in FIG. 15.

Referring to FIG. 16, reference waveform-plots are shown for the UPS 1500 to perform load sharing between the first power converter 1504 and the second power converter 1506 in accordance with one embodiment. According to one embodiment, the transitions between the first power converter 1504 and the second power converter 1506 performed during load sharing are controlled to prevent step-changes in the current drawn from the two boost circuits which might otherwise result at each transition. According to some embodiments, the preceding approach limits the stress placed on the components of the UPS 1500 and increases the accuracy of the control of the current drawn from the input 1509.

According to some embodiments, the load sharing between the first power converter 1504 and the second power converter 1506 is allowed to take place over a defined phase interval which is greater than +30 degrees about each zero crossing. For example, as the input current waveform approaches a zero crossing, the current in the second power converter 1506 is gradually increased beginning at 45 degrees before the zero crossing and is controlled to provide all of the current required by the UPS 30 degrees before the zero crossing. Similarly, the current in the second power converter 1506 is gradually reduced in the phase interval from 30 to 45 degrees after the zero-crossing so that the current equals zero 45 degrees after the zero crossing.

During these load sharing intervals of the second power converter 1506, the current in the first power converter is controlled so that the sum of the current drawn by the first power converter 1504 and the second power converter 1506 at any phase angle equals the total desired sinusoidal input current. It is to be appreciated that in other embodiments, the gradual increasing and decreasing of the current can occur more or less gradually than over the time occupied by the 15 degree phase interval selected relative to the period of the sinusoidal input current, in the above example. Further, the slope by which currents are increased or decreased during the defined phase interval may by linear (e.g. triangular) slopes or sinusoidal slopes.

Referring further to FIG. 16, a reference waveform 1702, generated by controllers 1650 and 1652, illustrates the desired total input current drawn by the UPS 1500 at the input 1509. In the illustrated embodiment, the waveform 1702 is a sinusoidal waveform.

In a further embodiment, the waveform 1702 is synchronized to the incoming voltage at the input 1509 by a PLL (Phase Locked Loop) and its amplitude is controlled by a DC bus voltage regulator which maintains the desired voltage level of the DC buses 1507, 1513, 1515, 1511. If the magnitude of the DC bus voltages drop, the input current at the input 1509 can be increased to supply more power to the DC buses 1507, 1513, 1515, 1511. Conversely, if the magnitude of the DC bus voltages increase, the input current at the input 1509 can be decreased to supply less power to the DC buses 1507, 1513, 1515, 1511.

Waveform 1704 illustrates a further reference waveform in accordance with one embodiment. According to this embodiment, the sine-wave 1704 illustrates a sine-wave having a frequency twelve times the frequency of the input current. Further, the waveform 1704 in the illustrated embodiment includes a DC offset which provides the waveform with a magnitude that ranges from 0 to 1. In a further embodiment, the waveform 1704 is also a function of phase angle and is synchronized to the incoming voltage at the input 1509 by a PLL (Phase Locked Loop), for example, at some multiple of the frequency of the reference waveform 1702. Accordingly, the waveform 1704 can be provided with a frequency such that the waveform 1704 is at a peak (magnitude equals 1) at each zero crossing and each peak of the reference waveform 1702.

According to one embodiment, a waveform 1706 is provided which includes a magnitude of +1 for a predefined region in the vicinity of the zero crossings of the reference waveform 1702 (and including the zero crossing). For example, in the illustrated embodiment, the waveform 1706 has a value of +1 for the region from +30 degrees to −30 degrees about each zero crossing of the reference waveform 1702, for example, during the phase intervals 1705. In other phase intervals, the waveform 1706 has a value equal to zero. In a further embodiment, a constant having a value greater than zero but different than +1 is employed in the phase intervals 1705. According to the illustrated embodiment, during other phase intervals 1707 the waveform 1706 follows the waveform 1704 as the waveform 1706 transitions between a value of 0 and a value of 1. For example, the phase intervals 1707 can be provided to generate a waveform 1706 that transitions in other than a step fashion between the phase intervals 1705 and the phase intervals during which the waveform 1706 has a magnitude of zero. Accordingly, in one embodiment, the waveform 1706 is a function of phase angle and is synchronized to the incoming voltage at the input 1509 by a PLL (Phase Locked Loop). The preceding result can be achieved by, for example, using the waveform 1704 at least in part to generate the waveform 1706.

According to one embodiment, the controller 1652 multiplies the multiplier waveform 1706 by the waveform 1702 to generate a reference waveform 1708 for the second power converter 1506. The reference waveform 1708 for the second power converter 1506 illustrates a waveform which determines when the second power converter 1506 draws current from the input 1509. In accordance with one embodiment, the waveform 1706 provides a current reference multiplier for the second power converter 1506. For example, the waveform 1706 can be multiplied by the reference waveform 1702 to provide a reference waveform 1708 where the reference waveform 1708 is employed in the control of the second power converter 1506. In a further embodiment, current is not drawn by the second power converter 1506 when the waveform 1706 has a value of 0. Conversely, 100% of the desired input current is drawn by the second power converter 1506 when the waveform 1706 has a value of 1. When the reference waveform 1708 has a value between 0 and 1 some portion of the total input current to the UPS 1500 is drawn by the second power converter 1506.

In the embodiment illustrated in FIG. 16, the current in the second power converter 1506 is gradually increased (in the positive or negative direction) beginning at 45 degrees before the zero crossing 1709 and is controlled to reach the required level 30 degrees before the zero crossing 1710. Similarly, the current in the second power converter 1506 is gradually reduced (in the positive or negative direction) beginning at 30 degrees after the zero crossing 1712 and is controlled to reach the required level 45 degrees after the zero crossing 1714.

According to a further embodiment, a combination of a reference waveform 1716 for the first power converter 1504 and the reference waveform 1708 for the second power converter 1506 provide the waveform 1702. For example, the controller 1650 can subtract the reference waveform 1708 for the second power converter 1506 from the waveform 1702 to generate the reference waveform 1716 for the first power converter 1504. The reference waveform 1716 for the first power converter 1504 illustrates a waveform that determines when the second power converter 1506 draws current from the input 1509. The reference waveform 1716 results in the first power converter 1504 drawing power from the input 1509 during portions of the reference waveform 1702 not utilized by the waveform 1708 for the second power converter 1506.

As described above, in one embodiment, transitions between UPS operation with the first power converter 1504 and UPS operation with the second power converter 1506 can be made without employing a step-wise change in operation of the two power converters. For example, when the current at the input 1509 of the UPS 1500 approaches the zero crossing, the current in the second power converter 1506 can be gradually increased beginning at 45 degrees before the zero crossing and is controlled to reach the required level 30 degrees before the zero crossing. Similarly, the current in the second power converter 1506 can be gradually reduced in the phase interval from 30 to 45 degrees after the zero-crossing so that 45 degrees after the zero crossing the current in the second power converter 1506 reaches zero.

According to one embodiment, the controller 1650 combines the positive portions of the reference waveforms 1713 for the first power converter 1504 from the three different phases (L1, L2, L3) of the three input lines 1503, 1505, 1508. The combined positive portions of the reference waveforms 1713 illustrate a waveform that determines when the positive boost circuit of the first power converter 1504 draws power from the input 1509. The controller 1650 combines the negative portions of the reference waveforms 1715 for the first power converter 1504 from the three different phases (L1, L2, L3) of the three input lines 1503, 1505, 1508. The combined positive portions of the reference waveforms 1715 illustrate a waveform that determines when the negative boost circuit of the first power converter 1504 draws power from the input 1509. Further, according to some embodiments, a separate waveforms corresponding to the waveforms 1704 and 1706 are employed for each phase of a multiphase input 1509, respectively, to generate a waveform corresponding to the waveform 1708 which varies in phase from phase to phase, for example by 120 degrees in a three phase system.

In the battery mode of operation, the reference waveforms used to control the battery charger/boost circuit 1553 may be DC references. In one embodiment, when the battery charger/boost circuit 1553 is operating as a boost circuit, the references are generated by the DC bus voltage regulator, whereas when the battery charger/boost circuit 1553 is running as a charger, the references are generated by a separate charge voltage regulator.

In some embodiments, the UPS 1500 of FIG. 15 can employ a modular topology for one or more of the power converters, for example, as generally illustrated in FIG. 1. According to one embodiment, the second power converter 1506 includes a plurality of power converters each coupled to a single phase of a multiphase AC input, respectively. Further, each of the second power converters includes an output connected to each of the DC buses 1507, 1511, 1513 and 1515.

While the present disclosure uses a co-packed devices (e.g., a switch and a diode coupled in parallel) other circuits can be used. For example, a circuit configured to allow a current to flow in a first direction substantially uninhibited, while selectively controlling current flow in a direction opposite from the first direction, can be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. Power converter circuitry comprising:
    an input including a plurality of input lines each configured to be coupled to a phase of a multiphase AC power source having a sinusoidal waveform;
    a plurality of DC buses including a first positive DC bus having a first nominal DC voltage, a second positive DC bus having a second nominal DC voltage, a first negative DC bus having a third nominal DC voltage and a second negative DC bus having a fourth nominal DC voltage;
    a first power converter coupled to the input and configured to supply power from the multiphase AC power source to the plurality of DC buses during a first positive region of the sinusoidal waveform and a first negative region of the sinusoidal waveform; and
    a second power converter coupled to the input and configured to supply power from the multiphase AC power source to at least some of the plurality of DC buses during a second positive region of the sinusoidal waveform and a second negative region of the sinusoidal waveform.

2. The power converter circuitry of claim 1, wherein the first positive region and the second positive region include different regions of the sinusoidal waveform, and wherein the first negative region and the second negative region include different regions of the sinusoidal waveform.

3. The power converter circuitry of claim 1, wherein the first power converter includes a positive boost circuit and a negative boost circuit,
    wherein the positive boost circuit is coupled to each of the input lines and is configured to draw current during the first positive region of the sinusoidal waveform for each phase of the multiphase AC power signal, and
    wherein the negative boost circuit is coupled to each of the input lines and is configured to draw current during the first negative region of the sinusoidal waveform for each phase of the multiphase AC power signal.

4. The power converter circuitry of claim 3, wherein the second power converter includes a plurality of positive boost circuits and a plurality of negative boost circuits,
    wherein the second power converter is configured to draw current during the second positive region using each of the plurality of positive boost circuits to draw current from a different one of the input lines of the multiphase AC power source, and
    wherein the second power converter is configured to draw current during the second negative region using each of the plurality of negative boost circuits to draw power from a different one of the input lines of the multiphase AC power source.

5. The power converter circuitry of claim 1, wherein the power converter circuitry is controlled such that a sum of current drawn at the input by the power converter circuitry provides a substantially sinusoidal current at all phase angles of the sinusoidal waveform.

6. The power converter circuitry of claim 1, wherein the first positive region includes phase angles of the sinusoidal waveform in a region about a phase angle of a peak positive amplitude of the sinusoidal waveform,
    wherein the first negative region includes phase angles of the sinusoidal waveform in a region about a phase angle of a peak negative amplitude of the sinusoidal waveform, and
    wherein the second positive region and the second negative region include phase angles of the sinusoidal waveform in a region about a zero crossing of the sinusoidal waveform.

7. The power converter circuitry of claim 1, wherein the second power converter is configured to supply power drawn from the multiphase AC power source to at least some of the plurality of DC buses at least for phase angles in a range of ±30 degrees about each zero crossing of the sinusoidal waveform.

8. The power converter circuitry of claim 1, further comprising a rectifier coupled to the input, the rectifier including an output coupled to an input of the first power converter.

9. The power converter circuitry of claim 8, further comprising a first switch configured to electrically isolate the rectifier from each phase of the multiphase AC power source, and a second switch configured to electrically isolate the second power converter from each phase of the multiphase AC power source.

* * * * *

UNITED STATES PATENT AND TRADEMARK OFFICE
CERTIFICATE OF CORRECTION

| | |
|---|---|
| PATENT NO. | : 8,385,091 B2 |
| APPLICATION NO. | : 12/544815 |
| DATED | : February 26, 2013 |
| INVENTOR(S) | : Henning Roar Nielsen |

It is certified that error appears in the above-identified patent and that said Letters Patent is hereby corrected as shown below:

On the Title Page of the Patent, item (73):

Assignee: "Electric IT Corporation" should be --Schneider Electric IT Corporation--

Signed and Sealed this
Fourteenth Day of May, 2013

Teresa Stanek Rea
*Acting Director of the United States Patent and Trademark Office*